United States Patent
Kenmochi et al.

(10) Patent No.: US 6,724,539 B2
(45) Date of Patent: Apr. 20, 2004

(54) INTERLEAVER

(75) Inventors: Tamoya Kenmochi, Hashimoto (JP); Hiroshi Suganuma, Yokohama (JP); Tomomi Sano, Yokohama (JP); Tetsuya Iimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/281,309

(22) Filed: Oct. 28, 2002

(65) Prior Publication Data

US 2003/0086180 A1 May 8, 2003

Related U.S. Application Data

(60) Provisional application No. 60/367,785, filed on Mar. 28, 2002.

(30) Foreign Application Priority Data

Nov. 2, 2001 (JP) ...................................... P2001-338237
Dec. 25, 2001 (JP) ...................................... P2001-392288

(51) Int. Cl.[7] ........................ G02B 27/14; G02B 27/10; G02B 27/28; H04J 14/02; G02F 1/035
(52) U.S. Cl. ........................ 359/634; 359/629; 359/637; 359/618; 359/487; 359/495; 359/497; 359/498; 398/79; 398/65; 385/2; 385/16
(58) Field of Search ............................. 398/65, 79, 86; 385/2, 3, 8, 16, 18; 359/634, 637, 629, 618, 487, 495, 497, 498, 484, 639, 640, 641

(56) References Cited

U.S. PATENT DOCUMENTS

| 5,477,385 | A | * | 12/1995 | Freeman | 359/629 |
| 6,498,680 | B1 | * | 12/2002 | Zhou et al. | 359/487 |
| 6,570,711 | B2 | * | 5/2003 | Ducellier | 359/629 |
| 6,614,573 | B1 | * | 9/2003 | Cao | 359/497 |

FOREIGN PATENT DOCUMENTS

EP        0 933 657 A2        8/1999

* cited by examiner

*Primary Examiner*—Loha Ben
(74) *Attorney, Agent, or Firm*—McDermott, Will & Emery

(57) ABSTRACT

The light which is input from an optical fiber to a first port is output to an optical path. The light which is input from the optical path to a half mirror is branched into two, and is output to the optical paths. The light which is output to the optical path reaches to and is reflected from a first reflecting mirror, and returns to the half mirror by an optical path. The light which is input to the half mirror by the optical path is branched into two, and is output to the optical paths. The light which is output to the optical path reaches to and is reflected from a second reflecting mirror, and returns to the half mirror by an optical path. The light which is input to the half mirror by the optical path is branched into two, and is output to the optical paths. The light which is output to the optical path is output from a second port to an optical fiber, and the light which is output to the optical path is output from a third port to an optical fiber.

21 Claims, 6 Drawing Sheets

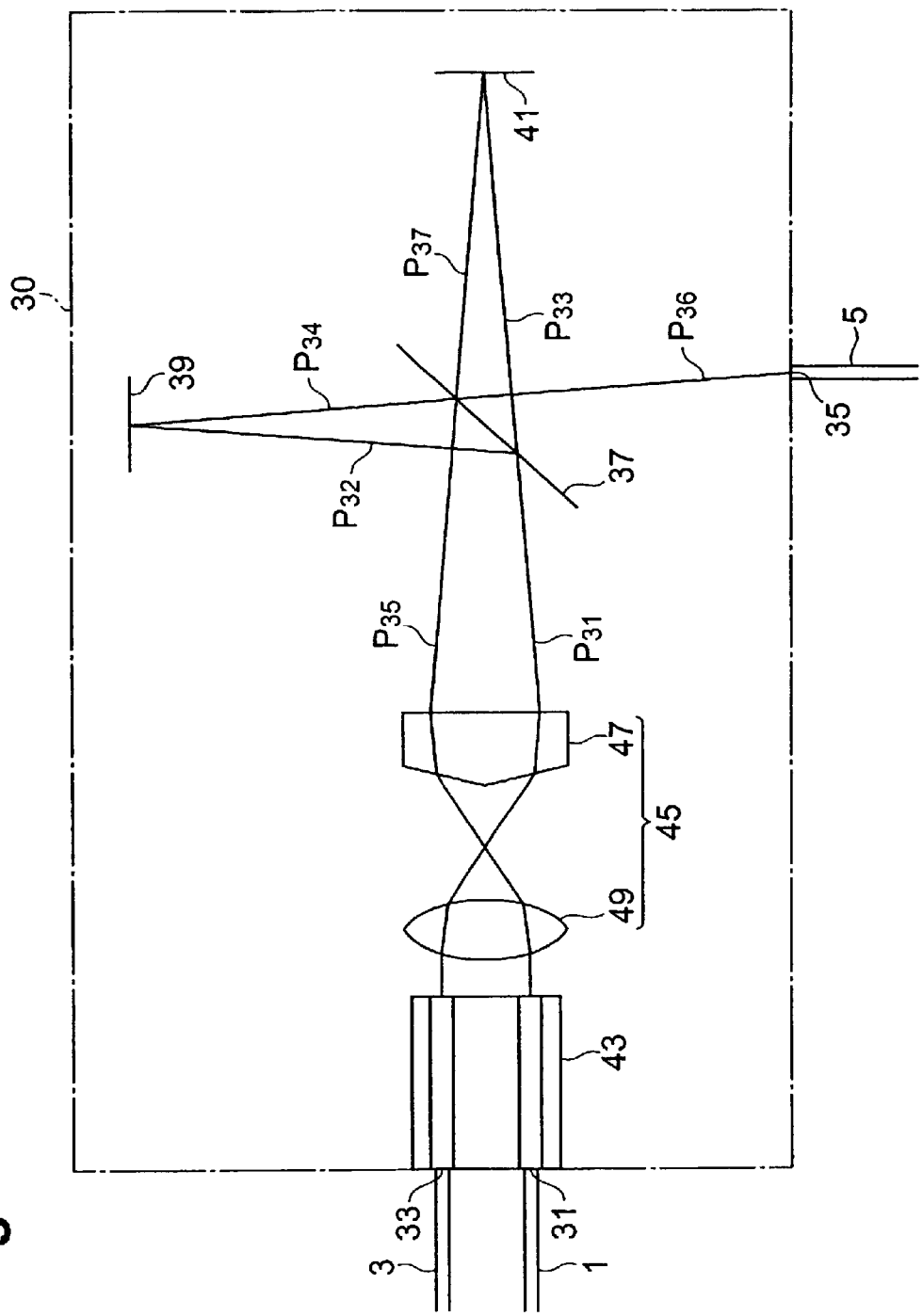

INTERLEAVER

CROSS REFERENCE

This application claims priority to Provisional Application Ser. No. 60/367,785 filed Mar. 28, 2002, which is/are hereby incorporated by reference in its/their entirety.

BACKGROUND OF THE INVENTION

1. Field of the Invention

The present invention relates to an interleaver for separating the wavelengths of light.

2. Related Background Art

An interleaver is for inputting a signal light with multi-band ($\lambda_1$, $\lambda_2$, - - - , $\lambda_{2n-1}$, $\lambda_{2n}$, - - - ) so as to separate into a signal light with a first wavelength group $\Lambda_1$ ($\lambda_1$, $\lambda_3$, - - - , $\lambda_{2n-1}$, - - - ) and a signal light with a second wavelength group $\Lambda_2$ ($\lambda_2$, $\lambda_4$, - - - , $\lambda_{2n}$, - - - ), and is installed in a relay of an optical communication system, for example. For such an interleaver, various types have been proposed, such as one comprised of a polarization separation element, wavelength filter and polarization composing element, or one comprised of an optical system which constitutes a Mach-Zehnder interferometer. An interleaver comprised of an optical system which constitutes a Michelson interferometer is also possible.

However, in the case of the interleaver comprised of an optical system which constitutes a general Michelson interferometer, an input optical axis and one of the output optical axes exist on a same axis, so an optical circulator for branching the input light and the output light is required. This makes the interleaver expensive and makes the optical system in the interleaver complicated.

With the foregoing in view, it is an object of the present invention to solve the above problems, and to provide an interleaver which is inexpensive and with a less complex optical system.

SUMMARY OF THE INVENTION

An interleaver according to the present invention comprises an optical system having a first port, a second port, a third port, a half mirror, a first reflecting mirror, and a second reflecting mirror, wherein light which reaches from the first port to the half mirror is branched into two, and these lights are output to the first reflecting mirror and the second reflecting mirror respectively, light which is reflected by the first reflecting mirror and reaches the half mirror is branched into two, and these lights are output to the second port and the third port respectively, and light which is reflected by the second reflecting mirror and reaches the half mirror is branched into two, and these lights are output to the second port and the third port respectively.

It is preferable that in the optical system, the output optical axis from the half mirror to the first reflecting mirror and the reflected optical axis from the first reflecting mirror cross at a predetermined angle greater than 0°, and the output optical axis from the half mirror to the second reflecting mirror and the reflected optical axis from the second reflecting mirror cross at a predetermined angle greater than 0°.

It is also preferable that in the optical system, the input optical axis from the first port to the half mirror and at least one of the output optical axes from the half mirror to the second port and the third port cross with the branching face of the half mirror at a predetermined angle other than 45°, so that the output optical axis from the half mirror to the first reflecting mirror and the reflected optical axis from the first reflecting mirror cross at an angle greater than 0°, and the output optical axis from the half mirror to the second reflecting mirror and the reflected optical axis from the second reflecting mirror cross at a predetermined angle greater than 0°.

It is also preferable that in the optical system, the output optical axis to the first reflecting mirror crosses with the reflecting face of the first reflecting mirror at a predetermined angle other than 90°, and the output optical axis to the second reflecting mirror crosses with the reflecting face of the second reflecting mirror at a predetermined angle other than 90°, so that the output optical axis from the half mirror to the first reflecting mirror and the reflected optical axis from the first reflecting mirror cross at a predetermined angle greater than 0°, and the output optical axis from the half mirror to the second reflecting mirror and the reflected optical axis from the second reflecting mirror cross at a predetermined angle greater than 0°.

It is also preferable that in the optical system, the input optical axis from the first port to the half mirror and at least one of the output optical axes from the half mirror to the second port and the third port cross with the branching face of the half mirror at a predetermined angle other than 45°, the output optical axis to the first reflecting mirror crosses with the reflecting face of the first reflecting mirror at a predetermined angle other than 90°, and the output optical axis to the second reflecting mirror crosses with the reflecting face of the second reflecting mirror at a predetermined angle other than 90°, so that the output optical axis from the half mirror to the first reflecting mirror and the reflected optical axis from the first reflecting mirror cross at a predetermined angle greater than 0°, and the output optical axis from the half mirror to the second reflecting mirror and the reflected optical axis from the second reflecting mirror cross at a predetermined angle greater than 0°.

It is also preferable that the interleaver further comprises optical axis correction means for paralleling the input optical axis from the first port and the output optical axis to the second port.

It is also preferable that the optical axis correction means further comprises a prism for converting a state where the input optical axis from the first port and the output optical axis to the second port cross at a predetermined angle into a state where the input optical axis and the output optical axis are parallel.

The present invention will become more fully understood from the detailed description given hereinbelow and the accompanying drawings which are given by way of illustration only, and thus are not to be considered as limiting the present invention.

An interleaver according to the present invention, further comprises a polarization separation element which is installed between the first port of the optical system and the half mirror for separating the light which reaches from the first port into two lights having polarization planes perpendicular to each other, and outputting the separated lights to different optical paths respectively.

It is preferable that the interleaver further comprises a polarization plane paralleling element which is installed between the polarization separation element and the half mirror of the optical system, inputs two lights which are output from the polarization separation element and have the polarization planes perpendicular to each other, parallels the polarization planes of the respective lights, and outputs the paralleled lights to the half mirror respectively.

It is also preferable that the interleaver further comprises a polarization plane orthogonalizing element which is installed between the half mirror and the second port of the optical system, inputs two lights which reach from the half mirror and have polarization planes parallel to each other, orthogonalizes the polarization planes of the respective lights, and outputs the orthogonalized lights to the second port respectively.

It is also preferable that the interleaver further comprises a polarization combining element which is installed between the polarization plane orthogonalizing element and the second port of the optical system, inputs two lights which are output from the polarization plane orthogonalizing element and have the polarization planes perpendicular to each other, combines these two lights, and outputs them to the second port.

It is also preferable that the interleaver further comprises a polarization plane orthogonalizing element which is installed between the half mirror and the third port of the optical system, inputs two lights which reach from the half mirror and have polarization planes parallel to each other, orthogonalizes the polarization planes of the respective light, and outputs the orthogonalized lights to the third port respectively.

It is also preferable that the interleaver further comprises a polarization combining element which is installed between the polarization plane orthogonalizing element and the third port of the optical system, inputs two lights which are output from the polarization plane orthogonalizing element and have the polarization planes perpendicular to each other, combines these two lights, and outputs them to the third port.

It is also preferable that the optical system outputs one of the two lights, which are output from the polarization separation element and have polarization planes perpendicular to each other, to the second port, and outputs the other light to the third port.

An interleaver according to the present invention further comprises a polarization separation element which is installed between the second port of the optical system and the half mirror for separating light which reaches from the half mirror into two lights having polarization planes perpendicular to each other, and outputting one of the separated lights to the second port; and a polarization separation element which is installed between the third port of the optical system and the half mirror for separating light which reaches from the half mirror into two lights having polarization planes perpendicular to each other, and outputting the light having a polarization plane, which is perpendicular to the polarization plane of the light to be output to the second port, to the third port.

It is preferable that in the optical system, the output optical axis from the half mirror to the first reflecting mirror and the reflected optical axis from the first reflecting mirror cross at a predetermined angle greater than 0°, and the output optical axis from the half mirror to the second reflecting mirror and the reflected optical axis from the second reflecting mirror cross at a predetermined angle greater than 0°.

Is also preferable that in the optical system, the input optical axis from the first port to the half mirror and at least one of the output optical axes from the half mirror to the second port and the third port cross with the branching face of the half mirror at a predetermined angle other than 45°, so that the output optical axis from the half mirror to the first reflecting mirror and the reflected optical axis from the first reflecting mirror cross at a predetermined angle greater than 0°, and the output optical axis from the half mirror to the second reflecting mirror and the reflected optical axis from the second reflecting mirror cross at a predetermined angle greater than 0°.

It is also preferable that in the optical system, the output optical axis to the first reflecting mirror crosses with the reflecting face of the first reflecting mirror at a predetermined angle other than 90°, and the output optical axis to the second reflecting mirror crosses with the reflecting face of the second reflecting mirror at a predetermined angle other than 90°, so that the output optical axis from the half mirror to the first reflecting mirror and the reflecting optical axis from the first reflecting mirror cross at a predetermined angle greater than 0°, and the output optical axis from the half mirror to the second reflecting mirror and the reflected optical axis from the second reflecting mirror cross at a predetermined angle greater than 0°.

It is also preferable that in the optical system, the input optical axis from the first port to the half mirror and at least one of the output optical axes from the half mirror to the second port and the third port cross with the branching face of the half mirror at a predetermined angle other than 45°, the output optical axis to the first reflecting mirror crosses with the reflecting face of the first reflecting mirror at a predetermined angle other than 90°, and the output optical axis to the second reflecting mirror crosses with the reflecting face of the second reflecting mirror at a predetermined angle other than 90°, so that the output optical axis from the half mirror to the first reflecting mirror and the reflected optical axis from the first reflecting mirror cross at a predetermined angle greater than 0°, and the output optical axis from the half mirror to the second reflecting mirror and the reflected optical axis from the second reflecting mirror cross at a predetermined angle greater than 0°.

It is also preferable that the interleaver further comprises optical axis correction means for paralleling the input optical axis from the first port and the output optical axis to the second port.

It is also preferable that the optical axis correction means further comprises a prism for converting a state where the input optical axis from the first port and the output axis to the second port cross at a predetermined angle into a state where the input optical axis and the output optical axis are parallel.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

FIG. 2 is a block diagram depicting the interleaver according to the second embodiment;

DESCRIPTION OF THE PREFERRED EMBODIMENT

Inter-leavers according to the embodiments of the present invention will now be described with reference to the accompanying drawings. In the following descriptions, the same elements or elements having the same function are denoted by the same symbols, where redundant descriptions are omitted.

(First Embodiment)

Figure 1:
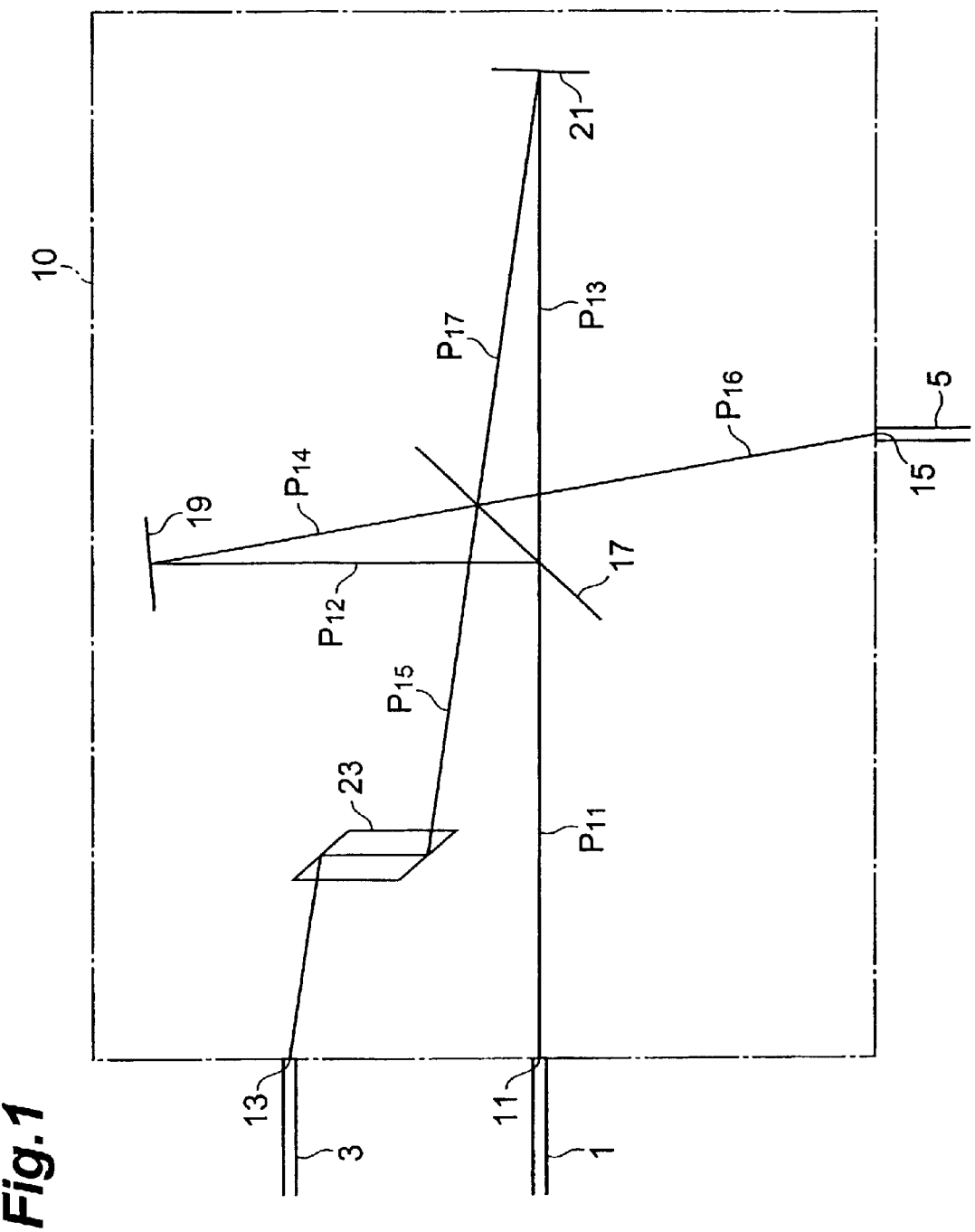
FIG. 1 is a block diagram depicting the interleaver according to the first embodiment.

An interleaver according to the first embodiment of the present invention will be described first. FIG. 1 is a block diagram depicting the interleaver 10 according to the present embodiment.

The interleaver 10 is comprised of a first port 11, second port 13, third port 15, half mirror 17, first reflecting mirror (total reflection mirror) 19, second reflecting mirror (total reflection mirror) 21, and a branching prism 23. The optical system, including the first port 11, second port 13, third port 15, half mirror 17, first reflecting mirror 19 and second reflecting mirror 21, constitutes a Michelson interferometer. In other words, the half mirror 17 branches light, which reaches from the first port 11, into two, then outputs one light to the first reflecting mirror 19 and the other light to the second reflecting mirror 21. The half mirror 17 also branches the light, which is reflected by the first reflecting mirror 19 and reaches the half mirror 17, into two, then outputs one light to the second port 13 and the other light to the third port 15. The half mirror 17 also branches light, which is reflected by the second reflecting mirror 21 and reaches the half mirror 17, into two, then outputs one light to the second port 13 and the other light to the third port 15.

The branching prism 23 is installed between the half mirror 17 and the second port 13, and outputs the light from the half mirror 17 to the second port 13 in a state where the space between the input optical axis from the first port 11 and the output optical axis to the second port 13 is spread.

In the optical system constituting the above mentioned Michelson interferometer, the optical axis from the half mirror 17 to the first reflecting mirror 19 (optical axis of the optical path $P_{12}$) and the reflected optical axis from the first reflecting mirror 19 (optical axis of the optical path $P_{14}$) cross at a predetermined angle greater than 0° (e.g. 0.8°), and the output optical axis from the half mirror 17 to the second reflecting mirror 21 (optical axis of the optical path $P_{13}$) and the reflected optical axis from the second reflecting mirror 21 (optical axis of the optical path $P_{17}$) cross at a predetermined angle greater than 0° (e.g. 0.8°), so that the input optical axis from the first port 11 and the output optical axis to the second port 13 are different when light is output to the second port 13.

And in the optical system constituting the above mentioned Michelson interferometer, in order to cross the output optical axis from the half mirror 17 to the first reflecting mirror 19 (optical axis of the optical path $P_{12}$) and the reflected optical axis from the first reflecting mirror 19 (optical axis of the optical path $P_{14}$) at the above mentioned predetermined angle, the output optical axis to the first reflecting mirror 19 (optical axis of the optical path $P_{12}$) is set so as to cross with the reflecting face of the first reflecting mirror 19 at a predetermined angle other than 90° (e.g. 89.6°). In the same way, in order to cross the output optical axis from the half mirror 17 to the second reflecting mirror 21 (optical axis of the optical path $P_{13}$) and the reflected optical axis from the second reflecting mirror 21 (optical axis of the optical path $P_{17}$) at the above mentioned predetermined angle, the output optical axis to the second reflecting mirror 21 (optical axis of the optical path $P_{13}$) is set so as to cross with the reflecting face of the second reflecting mirror 21 at a predetermined angle other than 90° (e.g. 89.6°).

Also in the optical system constituting the above mentioned Michelson interferometer, the output optical axes from the half mirror 17 to the second port 13 and to the third port 15 (optical axes of the optical paths $P_{15}$ and $P_{16}$) are set so as to cross with the branching face of the half mirror 17 at a predetermined angle other than 45° (e.g. 44.2°). The input optical axis from the first port 11 to the half mirror 17 (optical axis of the optical path $P_{11}$) is set so as to cross with the branching face of the half mirror 17 at 45°.

The output optical axes from the half mirror 17 to the second port 13 and to the third port 15 (optical axes of the optical paths $P_{15}$ and $P_{16}$) may be set so as to cross with the half mirror 17 at 45°, and the input optical axis from the first port 11 to the half mirror 17 (optical axis of the optical path $P_{11}$) maybe set so as to cross with the branching face of the half mirror 17 at the above mentioned predetermined angle other than 45°. Also the input optical axis from the first port 11 to the half mirror 17 (optical axis of the optical path $P_{11}$) and the output optical axes from the half mirror 17 to the second port 13 and to the third port 15 (optical axes of the optical paths $P_{15}$ and $P_{16}$) may be set so as to cross with the branching face of the half mirror 17 at a predetermined angle other than 45° respectively.

The light which is input to the half mirror 17 by the optical path $P_{11}$ is branched into two by the half mirror 17, then one light is output to the optical path $P_{12}$ and the other light is output to the optical path $P_{13}$. The light which is output from the half mirror 17 to the optical path $P_{12}$ is reflected by the first reflecting mirror 19, advances on the optical path $P_{14}$ to return to the half mirror 17, is branched into two by the half mirror 17, then one light is output to the optical path $P_{15}$ and the other light is output to the optical path $P_{16}$. The light which is output from the half mirror 17 to the optical path $P_{13}$ is reflected by the second reflecting mirror 21, advances on the optical path $P_{17}$ to return to the half mirror 17, is branched into two by the half mirror 17, then one light is output to the optical path $P_{15}$ and the other light is output to the optical path $P_{16}$.

This interleaver 10 operates as follows. The light which is input to the first port 11 by the optical fiber 1 is output to the optical path $P_{11}$. And the light which is input to the half mirror 17 by the optical path $P_{11}$ is branched into two by the half mirror 17, and is output to the optical paths $P_{12}$ and $P_{13}$. The light which is output to the optical path $P_{12}$ reaches to and is reflected back from the first reflecting mirror 19, and returns to the half mirror 17 by the optical path $P_{14}$. The light which is input to the half mirror 17 by the optical path $P_{14}$ is branched into two by the half mirror 17, and is output to the optical paths $P_{15}$ and $P_{16}$. The light which is output to the optical path $P_{13}$ reaches to and is reflected back from the second reflecting mirror 21, and returns to the half mirror 17 by the optical path $P_{17}$. The light which is input to the half mirror 17 by the optical path $P_{17}$ is branched into two by the half mirror 17, and is output to the optical paths $P_{15}$ and $P_{16}$.

The light which is output from the half mirror 17 to the optical path $P_{15}$ is light where lights which reach the half mirror 17 by the optical path $P_{14}$ and the optical path $P_{17}$ respectively are partially super-imposed, and is output to the optical fiber 3 in a state where the space from the optical path $P_{11}$ (input optical axis) is spread by the branching prism 23. The light which is output from the half mirror 17 to the optical path $P_{16}$ is also light where lights which reach the half mirror 17 by the optical path $P_{14}$ and the optical path $P_{17}$ respectively are partially super-imposed, and is output to the optical fiber 5.

In this interleaver 10, the Michelson interferometer, comprised of the optical system which includes the first port 11, second port 13, third port 15, half mirror 17, first reflecting mirror 19 and second reflecting mirror 21, has a transmission characteristic with a cycle according to the optical path length difference of the two optical paths. Therefore this interleaver 10 can input a signal light with multiband ($\lambda_1$, $\lambda_2$, - - - , $\lambda_{2n-1}$, $\lambda_{2n}$, - - - ) from the optical fiber 1, output the signal light with the first wavelength group $\Lambda_1$ ($\lambda_1$, $\lambda_3$, - - - , $\lambda_{2n-1}$, - - - ) to the optical fiber 3, and output the signal light with the second wavelength group $\Lambda_2$ ($\lambda_2$, $\lambda_4$, - - - , $\lambda_{2n}$, - - - ) to the optical fiber 5. Here $\lambda_1 < \lambda_2 < $ - - - $< \lambda_{2n-1} < \lambda_{2n} < $ - - - .

The light which is input from the first port 11 is output to the second port 13 and to the third port 15 by the half mirror 17 and by the reflecting mirrors 19 and 21, included in the optical system which constitutes the Michelson interferometer, as mentioned above. Therefore it is possible to implement the interleaver 10 comprised of an optical system which does not need an optical circulator, so the interleaver 10 which is inexpensive, and with a less complex optical system is provided.

(Second Embodiment)

An interleaver according to the second embodiment of the present invention will now be described. FIG. 2 is a block diagram depicting the interleaver 30 according to the present embodiment.

The interleaver 30 is comprised of a first port 31, second port 33, third port 35, half mirror 37, first reflecting mirror (total reflection mirror) 39, second reflecting mirror (total reflection mirror 41), dual collimator 43, and an optical axis correction section 45 (optical axis correction means). The optical system, including the first port 31, second port 33, third port 35, half mirror 37, first reflecting mirror 39, and second reflecting mirror 41, constitute a Michelson interferometer. In other words, the half mirror 37 branches light, which reaches from the first port 31, into two, then outputs one light to the first reflecting mirror 39 and outputs the other light to the second reflecting mirror 41. The half mirror 37 also branches the light, which is reflected by the first reflecting mirror 39 and reaches the half mirror 37, into two, then outputs one light to the second port 33 and outputs the other light to the third port 35. The half mirror 37 branches the light, which is reflected by the second reflecting mirror 41 and reaches the half mirror 37, into two, then outputs one light to the second port 33 and outputs the other light to the third port 35.

The first port 31 and the second port 33 are positioned at one end of the duel collimator 43. The optical axis correction section 45 is installed between the other end of the dual collimator 43 and the half mirror 37. This optical axis correction section 45 parallels the light which is output from the other end of the dual collimator 43 (input optical axis from the first port 31) and the light which is input to the other end of the dual collimator 43 (output optical axis to the second port 33), and includes a prism 47 and lens 49. The prism 47 and lens 49 are installed in the sequence of lens 49 and prism 47 viewed from the dual collimator 43 side.

The prism 47 is for converting a state where the light, which is output from the other end of the dual collimator 43, and the light, which is input to the other end of the dual collimator 43, cross at a predetermined angle (e.g. 0.8°) into a state where the output light and the input light are parallel.

In the optical system constituting the above mentioned Michelson interferometer, the output optical axis from the half mirror 37 to the first reflecting mirror 39 (optical axis of the optical path $P_{32}$) and the reflected optical axis from the first reflecting mirror 39 (optical axis of the optical path $P_{34}$) cross at a predetermined angle greater than 0° (e.g. 0.8°), and the output optical axis from the half mirror 37 to the second reflecting mirror 41 (optical axis of the optical path $P_{33}$) and the reflected optical axis from the second reflecting mirror 41 (optical axis of the optical path $P_{37}$) cross at a predetermined angle greater than 0° (e.g. 0.8°), so that the input optical axis from the first port 31 and the output optical axis to the second port 33 become different when light is output to the second port 33.

And in the optical system constituting the above mentioned Michelson interferometer, in order to cross the output optical axis from the first mirror 37 to the first reflecting mirror 39 (optical axis of the optical path $P_{32}$) and the reflected optical axis from the first reflecting mirror 39 (optical axis of the optical path $P_{34}$) at the above mentioned predetermined angle, the output optical axis to the first reflecting mirror 39 (optical axis of the optical path $P_{32}$) is set so as to cross with the reflecting face of the first reflecting mirror 39 at a predetermined angle other than 90° (e.g. 89.6°). In the same way, in order to cross the output optical axis from the half mirror 37 to the second reflecting mirror 41 (optical axis of the optical path $P_{33}$) and the reflected optical axis from the second reflecting mirror 41 (optical axis of the optical path $P_{37}$) at the above mentioned predetermined angle, the output optical axis to the second reflecting mirror 41 (optical axis of the optical path $P_{33}$) is set so as to cross with the reflecting face of the second reflecting mirror 41 at a predetermined angle other than 90° (e.g. 89.6°).

Also in the optical system constituting the above mentioned Michelson interferometer, the input optical axis from the first port 31 to the half mirror 37 (optical axis of the optical path $P_{31}$) is set so as to cross with the branching face of the half mirror 37 at a predetermined angle other than 45° (e.g. 44.6°), and the output optical axes from the half mirror 37 to the second port 33 and to the third port 35 (optical axes of the optical paths $P_{35}$ and $P_{36}$) are set so as to cross with the branching face of the half mirror 37 at a predetermined angle other than 45° (e.g. 44.6°).

The output optical axes from the half mirror 37 to the second port 33 and to the third port 35 (optical axes of the optical paths $P_{35}$ and $P_{36}$) may be set so as to cross the half mirror 37 at 45°, and the input optical axis from the first port 31 to the half mirror 37 (optical axis of the optical path $P_{31}$) may be set so as to cross with the branching face of the half mirror 37 at a predetermined angle other than 45°. Also the input optical axis from the first port 31 to the half mirror 37 (optical axis of the optical path $P_{31}$) may be set so as to cross with the half mirror 37 at 45°, and the output axes from the half mirror 37 to the second port 33 and to the third port 35 (optical axes of the optical paths $P_{35}$ and $P_{36}$) may be set so as to cross with the branching face of the half mirror 37 at a predetermined angle other than 45° respectively.

The light which is input to the half mirror 37 by the optical path $P_{31}$ is branched into two by the half mirror 37, then one light is output to the optical path $P_{32}$ and the other light is output to the optical path $P_{33}$. The light which is output from the half mirror 37 to the optical path $P_{32}$ is reflected by the first reflecting mirror 39, advances on the optical path $P_{34}$ to return to the half mirror 37, is branched into two by the half mirror 37, then one light is output to the optical path $P_{35}$, and the other light is output to the optical path $P_{36}$. The light which is output from the half mirror 37 to the optical path $P_{33}$ is reflected by the second reflecting mirror 41, advances on the optical path $P_{37}$ to return to the half mirror 37, is branched into two by the half mirror 37, then one light is output to the optical path $P_{35}$, and the other light is output to the optical path $P_{36}$.

The interleaver 30 operates as follows. The light which is input to the first port 31 by the optical fiber 1 is output to the optical path $P_{31}$ via the dual collimator 43 and the optical axis correction section 45 (lens 49 and prism 47). The light which is input to the half mirror 37 by the optical path $P_{31}$ is branched into two by the half mirror 37, and is output to the optical paths $P_{32}$ and $P_{33}$. The light which is output to the optical path $P_{32}$ reaches to and is reflected back from the first reflecting mirror 39, and returns to the half mirror 37 by the optical path $P_{34}$. The light which is input to the half mirror 37 by the optical path $P_{34}$ is branched into two by the half mirror 37, and is output to the optical paths $P_{35}$ and $P_{36}$. The light which is output to the optical path $P_{33}$ reaches to and is reflected back from the second reflecting light 41, and returns to the half mirror 37 by the optical path $P_{37}$. The light which is input to the half mirror 37 by the optical path $P_{37}$ is branched into two by the half mirror 37, and is output to the optical paths $P_{35}$ and $P_{36}$.

The light which is output from the half mirror 37 to the optical path $P_{35}$ is light where lights which reach the half mirror 37 by the optical path $P_{34}$ and the optical path $P_{37}$ respectively are partially super-imposed, and is output to the optical fiber 3 via the optical axis correction section 45 and the dual collimator 43. The light which is output from the half mirror 37 to the optical path $P_{36}$ is also light where lights which reach the half mirror 37 by the optical path $P_{34}$ and the optical path $P_{37}$ respectively are partially super-imposed, and is output to the optical fiber 5.

In this interleaver 30, the Michelson interferometer comprised of the optical system, which includes the first port 31, second port 33, third port 35, and half mirror 37, first reflecting mirror 39 and second reflecting mirror 41, has a transmission characteristic with a cycle according to the optical path length difference of the two optical paths. Therefore this interleaver 30 can input the signal light with multiband ($\lambda_1, \lambda_2, ---, \lambda_{2n-1}, \lambda_{2n}, ---$) by the optical fiber, separate the signal light, output the signal light with the first wavelength group $\Lambda_1$ ($\lambda_1, \lambda_3, ---, \lambda_{2n-1}, ---$) to the optical fiber, and output the signal light with the second wavelength group $\Lambda_2$ ($\lambda_2, \lambda_4, ---, \lambda_{2n}, ---$) to the optical fiber. Here $\lambda_1 < \lambda_2 < --- < \lambda_{2n-1} < \lambda_{2n} < ---$.

The light which is input from the first port 31 is output to the second port 33 and the third port 35 by the half mirror 37 and the reflecting mirrors 39 and 41, which are included in the optical system constituting the Michelson interferometer, as mentioned above. Therefore it is possible to implement the interleaver 30 comprised of an optical system which does not need an optical circulator, so the interleaver 30 is which inexpensive, and with a less complex optical system is provided.

Also the input optical axis from the first port 31 and the output optical axis to the second port 33 are paralleled by the optical axis correction section 45, so the occurrence of the loss of light which is input from the optical fiber 1 to the first port 31 and the light which is output from the second port 33 to the optical fiber 3 can be controlled.

The present invention is not limited by the above embodiments, but various modifications are possible. For example, in the above mentioned embodiments, a Gires-Tournois resonator, which includes a semi-transparent mirror, which transmittance is several tens %, and a total reflection mirror, may be used as one reflecting mirror.

(Third Embodiment)

Figure 3A:
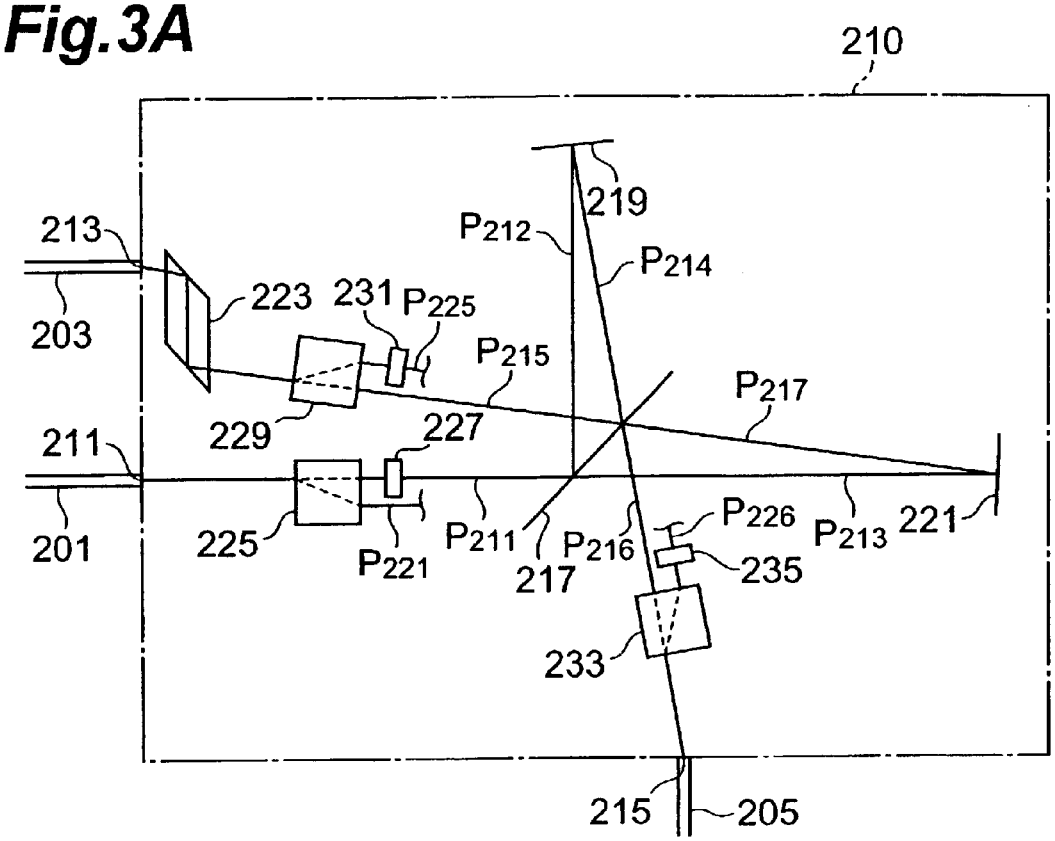
FIGS. 3A and 3B are block diagrams depicting the interleaver according to the third embodiment.
Figure 3B:
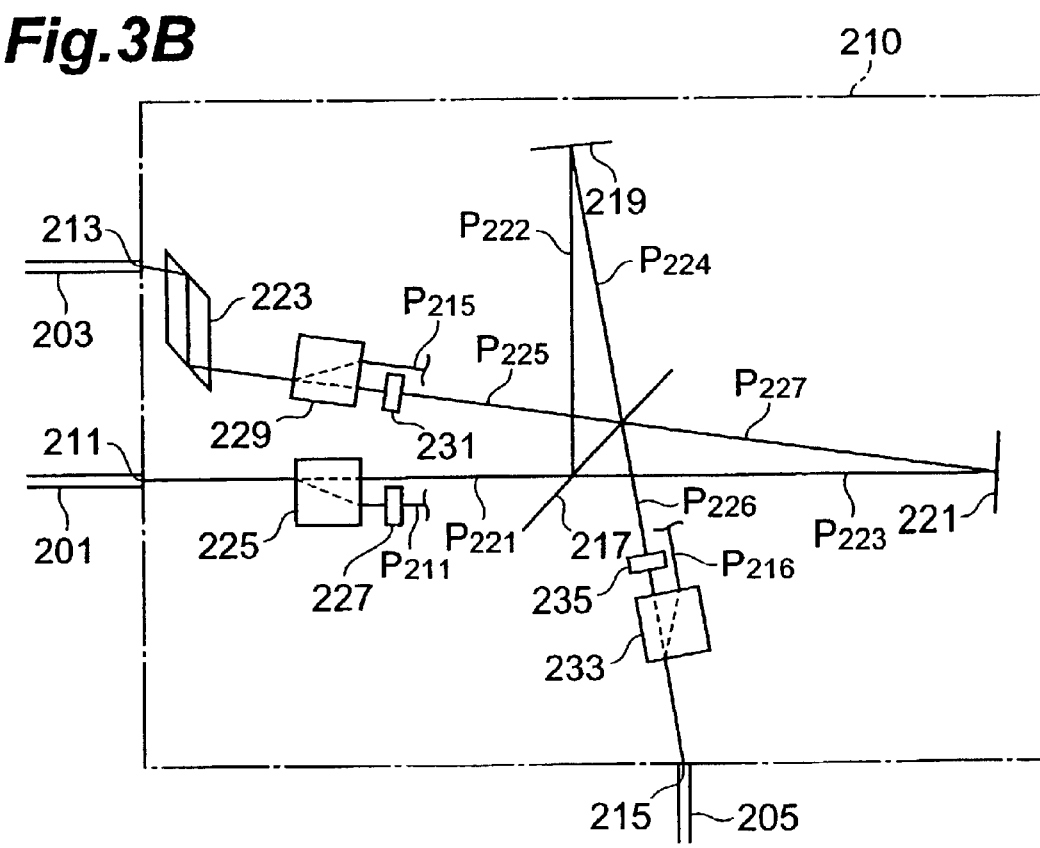

FIGS. 3A and 3B are block diagrams depicting the interleaver 10 according to the present embodiment. The optical system (optical path) shown in FIG. 3A and the optical system (optical path) shown in FIG. 3B are positioned at the top and bottom of each other in a direction vertical to the page face.

The interleaver 210 is comprised of a first port 211, second port 213, third port 215, half mirror 217, first reflecting mirror (total reflection mirror) 219, second reflecting mirror (total reflection mirror) 221, branching prism 223, polarization separation element 225, wavelength plate 227, polarization combining element 229, wavelength plate 231, polarization combining element 233, and a wavelength plate 235. The optical system, including the first port 211, second port 213, third port 215, half mirror 217, first reflecting mirror 219 and the second reflecting mirror 221, constitutes a Michelson interferometer. In other words, the half mirror 217 branches light, which reaches from the first port 211, into two, then outputs one light to the first reflecting mirror 219, and the other light to the second reflecting mirror 221. The half mirror 217 also branches the light, which is reflected by the first reflecting mirror 219 and reaches the half mirror 217, into two, then outputs one light to the second port 213, and the other light to the third port 215. The half mirror 217 also branches light, which is reflected by the second reflecting mirror and reaches the half mirror 217, into two, then outputs one light to the second port 213, and the other light to the third port 215.

The branching prism 223 is installed between the half mirror 217 and the second port 213, and outputs the light from the half mirror 217 to the second port 213 in a state where the space between the input optical axis from the first port 211 and the output optical axis to the second port 213 is spread.

The polarization separation element 225 is comprised of a double refraction material installed between the first port 211 and the half mirror 217, separates the light which reaches from the first port 211 into two lights having polarization planes perpendicular to each other, then outputs one light, that is light with the first polarization component, to the optical path $P_{211}$, and outputs the other light, that is light with the second polarization component, which is perpendicular to the light with the first polarization component, to the optical path $P_{221}$. The optical path $P_{211}$ and the optical path $P_{221}$ are positioned at the top and bottom of each other in a direction vertical to the page face in FIG. 3A and 3B.

The wavelength plate (polarization plane paralleling element) 227 is installed on the optical path $P_{211}$ between the polarization separation element 225 and the half mirror 217, rotates the polarization plane of light with the first polarization component, which is output from the polarization separation element 225 to the optical path $P_{211}$, by 90°, and outputs this light as the light with the second polarization component. In other words, this wavelength plate 227 parallels the polarization planes of the two lights having polarization planes perpendicular to each other, which are output from the polarization separation element 225 to the optical paths $P_{211}$ and $P_{221}$, and outputs these parallel lights to the half mirror 217 respectively.

As FIG. 3A shows, the light which is input to the half mirror 217 by the optical path $P_{211}$ is branched into two by the half mirror 217, then one light is output to the optical path $P_{212}$, and the other light is output to the optical path $P_{213}$. The light which is output from the half mirror 217 to the optical path $P_{212}$ is reflected by the first reflecting mirror 219, advances on the optical path $P_{214}$ to return to the half mirror 217, is branched into two by the half mirror 217, then one light is output to the optical path $P_{215}$, and the other light is output to the optical path $P_{216}$. The light which is output from the half mirror 217 to the optical path $P_{213}$ is reflected by the second reflecting mirror 221, advances on the optical path $P_{217}$ to return to the half mirror 217, is branched into two by the half mirror 217, then one light is output to the optical path $P_{215}$, and the other light is output to the optical path $P_{216}$. During this propagation, the light remains as light with the second polarization component.

As FIG. 3B shows, the light which is input to the half mirror 217 by the optical path $P_{221}$ is branched into two by the half mirror 217, then one light is output to the optical path $P_{222}$, and the other light is output to the optical path $P_{223}$. The light which is output from the half mirror 217 to the optical path $P_{222}$ is reflected by the first reflecting mirror 219, advances on the optical path $P_{224}$ to return to the half mirror 217, is branched into two by the half mirror 217, then one light is output to the optical path $P_{225}$, and the other light is output to the optical path $P_{226}$. The light which is output from the half mirror 217 to the optical path $P_{23}$ is reflected by the second reflecting mirror 221, advances on the optical path $P_{227}$ to return to the half mirror 217, is branched into two by the half mirror 217, then one light is output to the optical path $P_{225}$, and the other light is output to the optical path $P_{226}$. During this propagation, the light remains as light with the second polarization component.

The wavelength plate (polarization plane orthogonalizing element) 231 is installed on the optical path $P_{225}$ between the half mirror 217 and the second port 213, rotates the polarization plane of the light with the second polarization component, which is output from the half mirror 217 to the optical path $P_{225}$, by 90°, and outputs this light as light with the first polarization component. In other words, this wavelength plate 231 inputs the two lights having polarization planes parallel to each other, which are output from the half mirror 217 to the optical paths $P_{215}$ and $P_{225}$, orthogonalizes the polarization planes of each light, and outputs these orthogonalizing lights to the second port 213 respectively.

The polarization combining element 229 is comprised of a double refraction material installed between the wavelength plate 231 and the second port 213, inputs the two lights having polarization planes which are orthogonalized by the wavelength plate 231, combines the polarization of these lights, and outputs this light to the second port 213.

The wavelength plate (polarization plane orthogonalizing element) 235 is installed on the optical path $P_{226}$ between the half mirror 217 and the third port 215, rotates the polarization plane of the light with the second polarization component, which is output from the half mirror 217 to the optical path $P_{226}$, by 90°, and outputs this light as light with the first polarization component. In other words, this wavelength plate 235 inputs the two lights having polarization planes parallel to each other, which are output from the half mirror 217 to the optical paths $P_{216}$ and $P_{226}$, orthogonalizes the polarization planes of each light, and outputs these orthogonalized lights to the third port 215 respectively.

The polarization combining element 233 is comprised of a double refraction material installed between the wavelength plate 235 and the third port 215, inputs the two lights having polarization planes, which are orthogonalized by the wavelength plate 235, combines the polarization of these lights, and outputs this light to the third port 215.

In each optical system constituting the above mentioned Michelson interferometer, the output optical axes from the half mirror 217 to the first reflecting mirror 219 (optical axis of the optical path $P_{212}$ and optical axis of the optical path $P_{222}$) and the reflected optical axes from the first reflecting mirror 219 (optical axis of the optical path $P_{214}$ and optical axis of the optical path $P_{224}$) cross at a predetermined angle greater than 0°, (e.g. 0.3°), and the optical axes from the half mirror 217 to the second reflecting mirror 221 (optical axis of the optical path $P_{213}$ and optical axis of the optical path $P_{223}$) and the reflected optical axes from the second reflecting mirror 221 (optical axis of the optical path $P_{217}$ and optical axis of the optical path $P_{227}$) cross at a predetermined angle greater than 0° (e.g. 0.3°), so that the input optical axis from the first port 211 and the output optical axis to the second port 213 become different when the light is output to the second port 213.

And in each optical system constituting the above mentioned Michelson interferometer, in order to cross the output optical axes from the half mirror 217 to the first reflecting mirror 219 (optical axis of the optical path $P_{212}$ and optical axis of the optical path $P_{222}$) and the reflected optical axes from the first reflecting mirror 219 (optical axis of the optical path $P_{214}$ and optical axis of the optical path $P_{224}$) at the above mentioned predetermined angle, the output optical axes to the first reflecting mirror 219 (optical axis of the optical path $P_{212}$ and optical axis of the optical path $P_{222}$) are set so as to cross with the reflecting face of the first reflecting mirror 219 at a predetermined angle other than 90 (e.g. 89.7°). In the same way, in order to cross the output optical axes from the half mirror 217 to the second reflecting mirror 221 (optical axis of the optical path $P_{213}$ and optical axis of the optical path $P_{223}$) and the reflected optical axes from the second reflecting mirror 221 (optical axis of the optical path $P_{217}$ and optical axis of the optical path $P_{227}$) at the above mentioned predetermined angle, the output optical axes to the second reflecting mirror 221 (optical axis of the optical path $P_{213}$ and optical axis of the optical path $P_{223}$) are set so as to cross with the reflecting face of the second reflecting mirror 221 at a predetermined angle other than 90° (e.g. 89.7°).

Also in each optical system constituting the above mentioned Michelson interferometer, the output optical axes from the half mirror 217 to the second port 213 and the third port 215 (optical axes of the optical paths $P_{215}$ and $P_{216}$ and optical axes of the optical paths $P_{225}$ and $P_{226}$) are set so as to cross with the branching face of the half mirror 217 at a predetermined angle other than 45° (e.g. 44.7°). The input optical axes from the first port 211 to the half mirror 217 (optical axes of the optical path $P_{211}$ and optical axis of the optical path $P_{221}$) are set so as to cross with the branching face of the half mirror 217 at 45°.

The output optical axes from the half mirror 217 to the second port 213 and the third port 215 (optical axes of the optical paths $P_{215}$ and $P_{216}$ and optical axes of the optical paths $P_{225}$ and $P_{226}$) may be set so as to cross with the half mirror 217 at 45°, and the input optical axes from the first port 211 to the half mirror 217 (optical axis of the optical path $P_{211}$ and optical axis of the optical path $P_{221}$) may be set so as to cross with the branching face of the half mirror 217 at the above mentioned predetermined angle other than 45°. Also the input optical axes from the first port 211 to the half mirror 217 (optical axis of the optical path $P_{211}$ and optical axis of the optical path $P_{221}$) and the output optical axes from the half mirror 17 to the second port 213 and the third port 215 (optical axes of the optical paths $P_{215}$ and $P_{216}$ and optical axes of the optical paths $P_{225}$ and $P_{226}$) maybe set so as to cross with the branching face of the half mirror 217 at a predetermined angle other than 45° respectively.

This interleaver 210 operates as follows. The light which is input from the optical fiber 201 to the first port 211 is polarization-separated by the polarization separation element 225, then light with the first polarization component is output to the optical path $P_{211}$, and light with the second polarization component is output to the optical path $P_{221}$. The light with the first polarization component, which is output from the polarization separation element 225 to the optical path $P_{211}$, is converted into the light with the second polarization component by the wavelength plate 227.

The light which is input from the optical path $P_{211}$ to the half mirror 217 is branched into two by the half mirror 217, and is output to the optical paths $P_{212}$ and $P_{213}$. The light, which is output to the optical path $P_{212}$, reaches to and is reflected from the first reflecting mirror 219, and returns to the half mirror 217 by the optical path $P_{214}$. The light which is input to the half mirror 217 by the optical path $P_{214}$ is branched into two by the half mirror 217, and is output to the optical paths $P_{215}$ and $P_{216}$. The light which is output to the optical path $P_{213}$ reaches to and is reflected by the second reflecting mirror 221, and returns to the half mirror 217 by the optical path $P_{217}$. The light which is input to the half mirror 217 by the optical path $P_{217}$ is branched into two by the half mirror 217, and is output to the optical paths $P_{215}$ and $P_{216}$. During this propagation, the lights remains as the light with the second polarization component.

The light which is input to the half mirror 217 by the optical path $P_{221}$ is branched into two by the half mirror 217, and is output to the optical paths $P_{222}$ and $P_{223}$. The light which is output to the optical path $P_{222}$ reaches to and is reflected from the first reflecting mirror 219, and returns to the half mirror 217 by the optical path $P_{224}$. The light which is input to the half mirror 217 by the optical path $P_{224}$ is branched into two by the half mirror 217, and is output to the optical paths $P_{225}$ and $P_{226}$. The light which is output to the optical path $P_{223}$ reaches to and is reflected from the second reflecting mirror 221, and returns to the half mirror 217 by the optical path $P_{227}$. The light which is input to the half mirror 217 by the optical path $P_{227}$ is branched into two by the half mirror 217, and is output to the optical paths $P_{225}$ and $P_{226}$. During this propagation, the light remains as light with the second polarization component.

The light with the second polarization component, which is output from the half mirror 217 to the optical path $P_{215}$, is light where lights which reach the half mirror 217 by the optical path $P_{214}$ and optical path $P_{217}$ respectively are partially super-imposed. The light with the second polarization component, which is output from the half mirror 217 to the optical path $P_{225}$, is light where lights which reach the half mirror 217 from the optical path $P_{224}$ and optical path $P_{227}$ respectively are partially super-imposed. The light with the second polarization component, which is output from the half mirror 217 to the optical path $P_{225}$, is converted into the light with the first polarization component by the wavelength plate 231. The light on the optical path $P_{225}$ which is converted into the light with the first polarization component by the wavelength plate 231 and the light with the second polarization component, which is output from the half mirror 217 to the optical path $P_{215}$, are polarization-combined by the polarization combining element 229. This light, after the polarization combining, is output to the optical fiber 203 in a state where the space from the optical path $P_{211}$ (input optical axis) is spread by the branching prism 223.

The light with the second polarization component, which is output from the half mirror 217 to the optical path $P_{216}$, is light where lights which reach the half mirror 217 by the optical path $P_{214}$ and optical path $P_{217}$ respectively are partially super-imposed. The light with the second polarization component, which is output from the half mirror 217 to the optical path $P_{226}$, is light where lights which reach the half mirror 217 by the optical path $P_{224}$ and optical path $P_{227}$ respectively are partially super-imposed. The light with the second polarization component, which is output from the half mirror 217 to the optical path $P_{226}$, is converted into light with the first polarization component by the wavelength plate 235. And the light on the optical path $P_{226}$ which is converted into light with the first polarization component by the wavelength plate 235 and the light with the second polarization component, which is output from the half mirror 217 to the optical path $P_{216}$, are polarization-combined by the polarization combining element 233. This light, after the polarization-combining, is output to the optical fiber 205.

In this interleaver 210, the Michelson interferometer comprised of the optical system, which includes the first port 211, second port 213, third port 215, half mirror 217, first reflecting mirror 219 and the second reflecting mirror 221, has a transmission characteristic with a cycle according to the optical path length difference of the two optical paths. Therefore this interleaver 210 can input the signal light with multiband ($\lambda_1, \lambda_2, ---, \lambda_{2n-1}, \lambda_{2n}, ---$) by the optical fiber 201, separate the signal light, output the signal light with the first wavelength group $\Lambda_1$ ($\lambda_1, \lambda_3, ---, \lambda_{2n-1}, ---$) to the optical fiber 203, and output the signal light with the second wavelength group $\Lambda_2$ ($\lambda_2, \lambda_4, ---, \lambda_{2n}, ---$) to the optical fiber 205. Here $\lambda_1 < \lambda_2 < --- < \lambda_{2n-1} < \lambda_{2n} < ---$.

The polarization state of the light when entering the half mirror 217, first reflecting mirror 219 and the second reflecting mirror 221 respectively, is constant, regardless the polarization state of the light which is input by the optical fiber 201. Therefore the transmission characteristic of light in the first wavelength area $\Lambda_1$ from the optical fiber 201 to the optical fiber 203, and the transmission characteristic of light in the second wavelength area $\Lambda_2$ from the optical fiber 201 to the optical fiber 205, have a polarization dependency which is controlled respectively.

The light, which is input from the first port 211, is output to the second port 213 and the third port 215 by the half mirror 217 and the reflecting mirrors 219 and 221, which are included in the optical system constituting the Michelson interferometer, as mentioned above. Therefore it is possible to implement the interleaver 210 comprised of an optical system which does not need an optical circulator, so the interleaver 210 which is inexpensive and with a less complex optical system is provided.

(Fourth Embodiment)

Figure 4A:
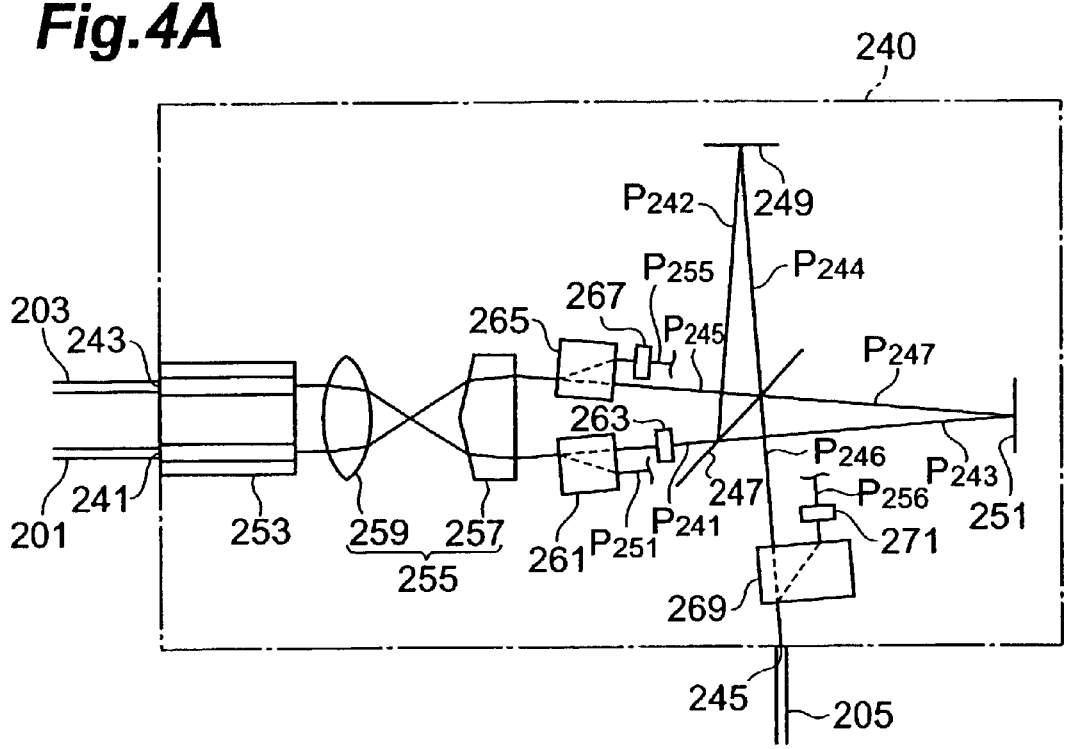
FIGS. 4A and 4B are block diagrams depicting the interleaver according to the fourth embodiment.
Figure 4B:
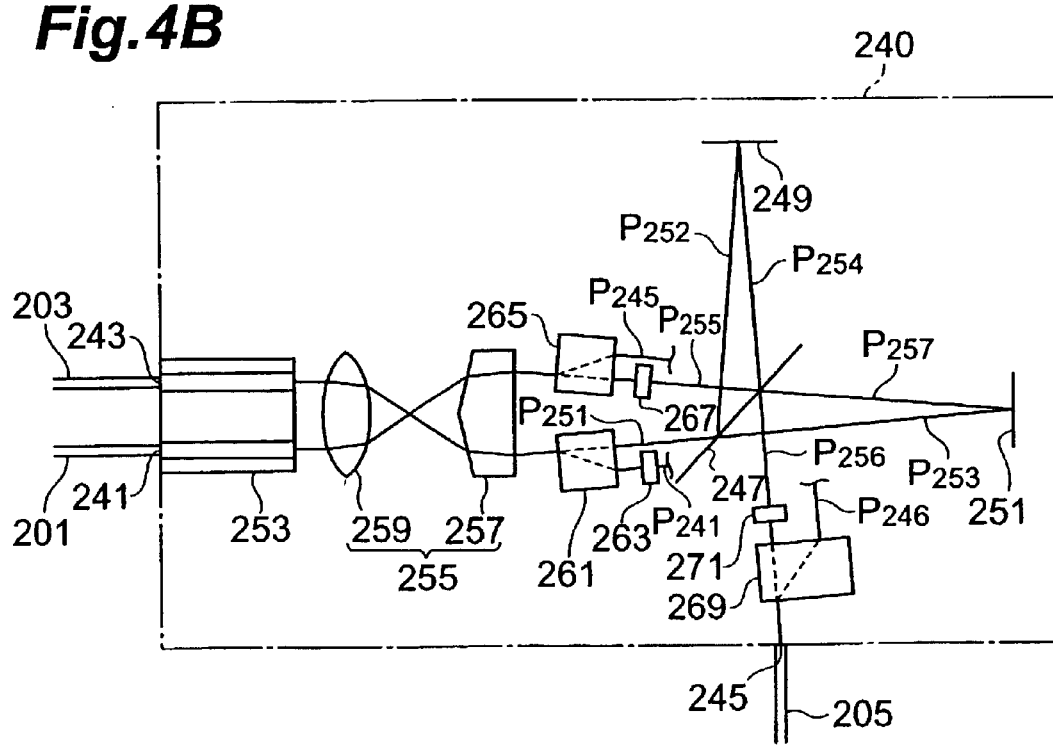

An interleaver according to the fourth embodiment of the present invention will now be described. FIGS. 4A and 4B are block diagrams depicting the interleaver 240 according to the present embodiment. The optical system (optical path) shown in FIG. 4A and the optical system (optical path) shown in FIG. 4B are positioned at the top and bottom of each other in a direction vertical to the page face.

The interleaver 240 is comprised of a first port 241, second port 243, third port 245, half mirror 247, first reflecting mirror (total reflection mirror) 249, second reflecting mirror (total reflection mirror) 251, dual collimator 253 and an optical axis correction section 255 (optical axis correction means). The optical system, including the first port 241, second port 243, third port 245, half mirror 247, first reflecting mirror 249 and second reflecting mirror 251, constitutes the Michelson interferometer. In other words, the half mirror 247 branches the light, which reaches from the first port 241, into two, then outputs one light to the first reflecting mirror 249, and outputs the other light to the second reflecting mirror 251. The half mirror 247 also branches the light, which is reflected by the first reflecting mirror 249 and reaches the half mirror 247, into two, then outputs one light to the second port 243, and outputs the other light to the third port 245. The half mirror 247 also branches light, which is reflected by the second reflecting mirror 251 and reaches the half mirror 247, into two, then outputs one light to the second port 243, and outputs the other light to the third port 245.

The first port 241 and the second port 243 are positioned at one end of the dual collimator 253. And the optical axis correction section 255 is installed between the other end of the dual collimator 253 and the half mirror 247. This optical axis correction section 255 parallels the light which is output from the other end of the dual collimator 253 (input optical axis of the first port 241) and the light which is input to the other end of the dual collimator 253 (output optical axis to the second port 243), and includes a prism 257 and a lens 259. The prism 257 and lens 259 are installed in the sequence of the lens 259 and prism 257 viewed from the dual collimator 253 side.

The prism 257 is for converting a state where the light which is output from the other end of the dual collimator 253 and the light which is input to the other end of the dual collimator 253 cross at a predetermined angle (e.g. 0.3°) into a state where the output light and the input light are parallel.

The polarization separation element 261 is comprised of a double refraction material installed between the first port 241 and the half mirror 247, separates the light which reaches from the first port 241 into two lights having polarization planes perpendicular to each other, then outputs one light, that is light with the first polarization component, to the optical path $P_{241}$, and outputs the other light, that is light with the second polarization component, which is perpendicular to the light with the first polarization component, to the optical path $P_{251}$. The optical path $P_{241}$ and the optical path $P_{251}$ are positioned at the top and bottom of each other in a direction vertical to the page face in FIGS. 4A and 4B.

The wavelength plate (polarization paralleling element) 263 is installed on the optical path $P_{241}$ between the polarization separation element 261 and the half mirror 247, rotates the polarization plane of the light with the first polarization component, which is output from the polarization separation element 261 to the optical path $P_{241}$, by 90°, and outputs this light as the light with the second polarization component. In other words, this wavelength plate 263 parallels the polarization planes perpendicular to each other, which are output from the polarization separation element 261 to the optical paths $P_{241}$ and $P_{251}$, and outputs the paralleled lights to the half mirror 247 respectively.

As FIG. 4A shows, the light, which is input to the half mirror 247 by the optical path $P_{241}$, is branched into two by the half mirror 247, then one light is output to the optical path $P_{242}$, and the other light is output to the optical path $P_{243}$. The light which is output from the half mirror 247 to the optical path $P_{242}$ is reflected by the first reflecting mirror 249, advances on the optical path $P_{244}$ to return to the half mirror 247, is branched into two by the half mirror 247, then one light is output to the optical path $P_{245}$, and the other light is output to the optical path $P_{246}$. The light which is output from the half mirror 247 to the optical path $P_{243}$ is reflected by the second reflecting mirror 251, advances on the optical path $P_{247}$ to return to the half mirror 247, is branched into two by the half mirror 247, then one light is output to the optical path $P_{245}$, and the other light is output to the optical path $P_{246}$. During this propagation, the light remains as light with the second polarization component.

As FIG. 4B shows, the light, which is input to the half mirror 247 by the optical path $P_{251}$, is branched into two by the half mirror 247, then one light is output to the optical path $P_{252}$, and the other light is output to the optical path $P_{253}$. The light which is output from the half mirror 247 to the optical path $P_{252}$ is reflected by the first reflecting mirror 249, advances on the optical path $P_{254}$ to return to the half mirror 247, is branched into two by the half mirror 247, then one light is output to the optical path $P_{255}$, and the other light is output to the optical path $P_{256}$. The light which is output from the half mirror 247 to the optical path $P_{253}$ is reflected by the second reflecting mirror 251, advances on the optical path $P_{257}$ to return to the half mirror 247, is branched into two by the half mirror 247, then one light is output to the optical path $P_{255}$, and the other light is output to the optical path $P_{256}$. During this propagation, the light remains as light with the second polarization component.

The wavelength plate (polarization plane orthogonalizing element) 267 is installed on the optical path $P_{255}$ between the half mirror 247 and the second port 243, rotates the polarization plane of the light with the second polarization element, which is output from the half mirror 247 to the optical path $P_{255}$, by 90°, and outputs this light as the light with the first polarization component. In other words, this wavelength plate 267 inputs the two lights having polarization planes parallel to each other, which are output from the half mirror 247 to the optical paths $P_{245}$ and $P_{255}$, orthogonalizes the polarization planes of each light, and outputs these orthogonalized lights to the optical axis correction section 255 (second port 243) respectively.

The polarization combining element 265 is comprised of a double refraction material installed between the wavelength plate 267 and the second port 243, inputs the two lights having polarization planes which are orthogonalized by the wavelength plate 267, combines the polarization of these lights, and outputs this light to the optical axis correction section 255 (second port 243).

The wavelength plate (polarization plane orthogonalizing element) 271 is installed on the optical path $P_{256}$ between the half mirror 247 and the third port 245, rotates the polarization plane of the light with the second polarization component, which is output from the half mirror 247 to the optical path $P_{256}$, by 90°, and outputs this light as the light with the first polarization component. In other words, this wavelength plate 271 inputs the two lights having polarization planes parallel to each other, which are output from the half mirror 247 to the optical path $P_{246}$ and $P_{256}$, orthogonalizes the polarization planes of each light, and outputs these orthogonalized lights to the third port 245 respectively.

The polarization combining element 269 is comprised of a double refraction material installed between the wavelength plate 271 and the third port 245, inputs the two lights having polarization planes which are orthogonalized by the wavelength plate 271, combines the polarization of these lights, and outputs this light to the third port 245.

In each optical system constituting the above mentioned Michelson interferometer, the output optical axes from the half mirror 247 to the first reflecting mirror 249 (optical axis of the optical path $P_{242}$ and optical axis of the optical path $P_{252}$) and the reflected optical axes from the first reflecting mirror 249 (optical axis of the optical path $P_{244}$ and optical axis of the optical path $P_{255}$) cross at a predetermined angle greater than 0° (e.g. 0.3°), and the output optical axes from the half mirror 247 to the second reflecting mirror 251 (optical axis of the optical path $P_{243}$ and optical axis of the optical path $P_{255}$) and the reflected optical axes from the second reflecting mirror 251 (optical axis of the optical path $P_{247}$ and optical axis of the optical path $P_{257}$) cross at a predetermined angle greater than 0° (e.g. 0.3°), so that the input optical axis from the first port 241 and the output optical axis to the second port 243 become different when the light is output to the second port 243.

And in each optical system constituting the above mentioned Michelson interferometer, in order to cross the output optical axes from the half mirror 247 to the first reflecting mirror 249 (optical axis of the optical path $P_{242}$ and optical axis of the optical path $P_{252}$) and the reflected optical axis from the first reflecting mirror 249 (optical axis of the optical path $P_{244}$ and optical axis of the optical path $P_{255}$) at the above mentioned predetermined angle, the output optical axes to the first reflecting mirror 249 (optical axis of the optical path $P_{242}$ and optical axis of the optical path $P_{252}$) are set so as to cross with the reflecting face of the first reflecting mirror 249 at a predetermined angle other than 90° (e.g. 89.7°). In the same way, in order to cross the output optical axes from the half mirror 247 to the second reflecting mirror 251 (optical axis of the optical path $P_{243}$ and optical axis of the optical path $P_{255}$) and the reflected optical axes from the second reflecting mirror 251 (optical axis of the optical path $P_{247}$ and optical axis of the optical path $P_{257}$) at the above mentioned predetermined angle, the output optical axes to the second reflecting mirror 251 (optical axis of the optical path $P_{243}$ and optical axis of the optical path $P_{255}$) are set so as to cross with the reflecting face of the second reflecting mirror 251 at a predetermined angle other than 90° (e.g. 89.7°).

Also in each optical system constituting the above mentioned Michelson interferometer, the input axes from the first port 241 to the half mirror 247 (optical axis of the optical path $P_{241}$ and optical axis of the optical path $P_{251}$) are set so as to cross with the branching face of the half mirror 247 at a predetermined angle other than 45° (e.g. 44.7°), and the output axes from the half mirror 247 to the second port 243 and the third port 245 (optical axes of the optical paths $P_{245}$ and $P_{246}$, and optical axes of the optical paths $P_{255}$ and $P_{256}$) are set so as to cross with the branching face of the half mirror 247 at a predetermined angle other than 45° (e.g. 44.7°).

The output optical axes from the half mirror 247 to the second port 243 and the third port 245 (optical axes of the optical paths $P_{245}$ and $P_{246}$ and optical axes of the optical paths $P_{255}$ and $P_{256}$) may be set so as to cross with the half mirror 247 at 45°, and the input optical axes from the first port 241 to the half mirror 247 (optical axis of the optical path $P_{241}$ and optical axis of the optical path $P_{251}$) may be set so as to cross with the branching face of the half mirror 247 at a predetermined angle other than 45°. Also the input optical axes from the first port 241 to the half mirror 247 (optical axis of the optical path $P_{241}$ and optical axis of the optical path $P_{251}$) may be set so as to cross with the half mirror 247 at 45°, and the output optical axes from the half mirror 247 to the second port 243 and the third port 245 (optical axes of the optical paths $P_{245}$ and $P_{246}$ and optical axes of the optical paths $P_{255}$ and $P_{256}$) may be set so as to cross with the branching face of the half mirror 247 at a predetermined angle other than 45° respectively.

This interleaver 210 operates as follows. The light which is input from the optical fiber 201 to the first port 241 is polarization-separated by the polarization separation element 261 via the dual collimator 253 and the optical axis correction section 255 (lens 259 and prism 257), then light with the first polarization component is output to the optical path $P_{241}$, and light with the second polarization component is output to the optical path $P_{251}$. The light with the first polarization component, which is output from the polarization separation element 261 to the optical path $P_{241}$, is converted into the light with the second polarization component by the wavelength plate 263.

The light, which is input from the optical path $P_{241}$ to the half mirror 247, is branched into two by the half mirror 247, and is output to the optical paths $P_{242}$ and $P_{243}$. The light which is output to the optical path $P_{242}$ reaches to and is reflected from the first reflecting mirror 249, and returns to the half mirror 247 by the optical path $P_{244}$. The light, which is input to the half mirror 247 by the optical path $P_{244}$, is branched into two by the half mirror 247, and is output to the optical paths $P_{245}$ and $P_{246}$. The light which is output to the optical path $P_{243}$ reaches to and is reflected from the second reflecting mirror 251, and returns to the half mirror 247 by the optical path $P_{247}$. The light, which is input to the half mirror 247 by the optical path $P_{247}$, is branched into two by the half mirror 247, and is output to the optical paths $P_{245}$ and $P_{246}$. During this propagation, the light remains as light with the second polarization component.

The light, which is input to the half mirror 247 by the optical path $P_{251}$, is branched into two by the half mirror 247, and is output to the optical paths $P_{252}$ and $P_{253}$. The light which is output to the optical path $P_{252}$ reaches to and is reflected from the first reflecting mirror 249, and returns to the half mirror 247 by the optical path $P_{254}$. The light which is input to the half mirror 247 by the optical path $P_{254}$ is branched into two by the half mirror 247, and is output to the optical paths $P_{255}$ and $P_{256}$. The light which is output to the optical path $P_{253}$ reaches to and is reflected from the second reflecting mirror 251, and returns to the half mirror 247 by the optical path $P_{257}$. The light, which is input to the half mirror 247 by the optical path $P_{257}$, is branched into two by the half mirror 247, and is output to the optical paths $P_{255}$ and $P_{256}$. During this propagation, the light remains as the light with the second polarization component.

The light with the second polarization component, which is output from the half mirror 247 to the optical path $P_{245}$, is light where lights which reach the half mirror 247 from the optical path $P_{244}$ and the optical path $P_{247}$ respectively are partially super-imposed. The light with the second polarization component, which is output from the half mirror 247 to the optical path $P_{255}$, is light where lights which reach the half mirror 247 by the optical path $P_{254}$ and the optical path $P_{257}$ respectively are partially super-imposed. The light with the second polarization component, which is output from the half mirror 247 to the optical path $P_{255}$, is converted into the light with the first polarization component by the wavelength plate 267. The light on the optical path $P_{255}$, which is converted into the light with the first polarization component by the wavelength plate 267, and the light with the second polarization component which is output from the half mirror 247 to the optical path $P_{245}$, are polarization-combined by the polarization combining element 265. This light, after the polarization combining, is output to the optical fiber 203 via the optical axis correction section 255 and the dual collimator 253.

The light with the second polarization component, which is output from the half mirror 247 to the optical path $P_{246}$, is light where lights which reach the half mirror 247 by the optical path $P_{244}$ and the optical path $P_{247}$ respectively are partially super-imposed. The light with the second polarization component, which is output from the half mirror 247 to the optical path $P_{256}$, is light where lights which reach the half mirror 247 by the optical paths $P_{254}$ and $P_{257}$ respectively are super-imposed. The light with the second polarization component, which is output from the half mirror 247 to the optical path $P_{256}$, is converted into light with the first polarization component by the wavelength plate 271. And the light on the optical path $P_{256}$, which is converted into the light with the first polarization component by the wavelength plate 271, and the light with the second polarization component, which is output from the half mirror 247 to the optical path $P_{246}$, are polarization-combined by the polarization combining element 269. This light, after the polarization combining, is output to the optical fiber 205.

In this interleaver 240, the Michelson interferometer comprised of the optical system, which includes the first port 241, second port 243, third port 245, half mirror 247, first reflecting mirror 249 and the second reflecting mirror 251, has a transmission characteristic with a cycle according to the optical path length difference of the two optical paths. Therefore this interleaver 240 can input the signal light with multiband $(\lambda_1, \lambda_2, ---, \lambda_{2n-1}, \lambda_{2n}, ---)$ by the optical fiber 201, separate the signal light, output the signal light with the first wavelength group $\Lambda_1$ $(\lambda_1, \lambda_3, ---, \lambda_{2n-1}, ---)$ to the optical fiber, and output the signal light with the second wavelength group $\Lambda_2$ $(\lambda_2, \lambda_4, ---, \lambda_{2n}, ---)$ to the optical fiber 205. Here $\lambda_1 < \lambda_2 < --- < \lambda_{2n-1} < \lambda_{2n} < ---$.

The polarization state of the light when entering the half mirror, first reflecting mirror 249 and the second reflecting mirror 251 respectively, is constant, regardless the polarization state of the light which is input from the optical fiber 201. Therefore the transmission characteristic of the light in the first wavelength area $\Lambda_1$ from the optical fiber 201 to the optical fiber 203, and the transmission characteristic of the light in the second wavelength area $\Lambda_2$ from the optical fiber 201 to the optical fiber 205, have a polarization dependency, which is controlled respectively.

The light, which is input from the first port 241, is output to the second port 243 and the third port 245 by the half mirror 247 and the reflecting mirrors 249 and 251, which are included in the optical system constituting the Michelson interferometer, as mentioned above. Therefore it is possible to implement the interleaver 240 comprised of an optical system which does not need an optical circulator, so the interleaver 240 which is inexpensive and with a less complex optical system is provided.

Also the input optical axis from the first port 241 is paralleled with the output optical axis to the second port 243 by the optical axis correction section 255, so the loss which occurs to the light to be input from the optical fiber 201 to the first port 241 and the light to be output from the second port 243 to the optical fiber 203 can be controlled.

(Fifth Embodiment)

Figure 5A:
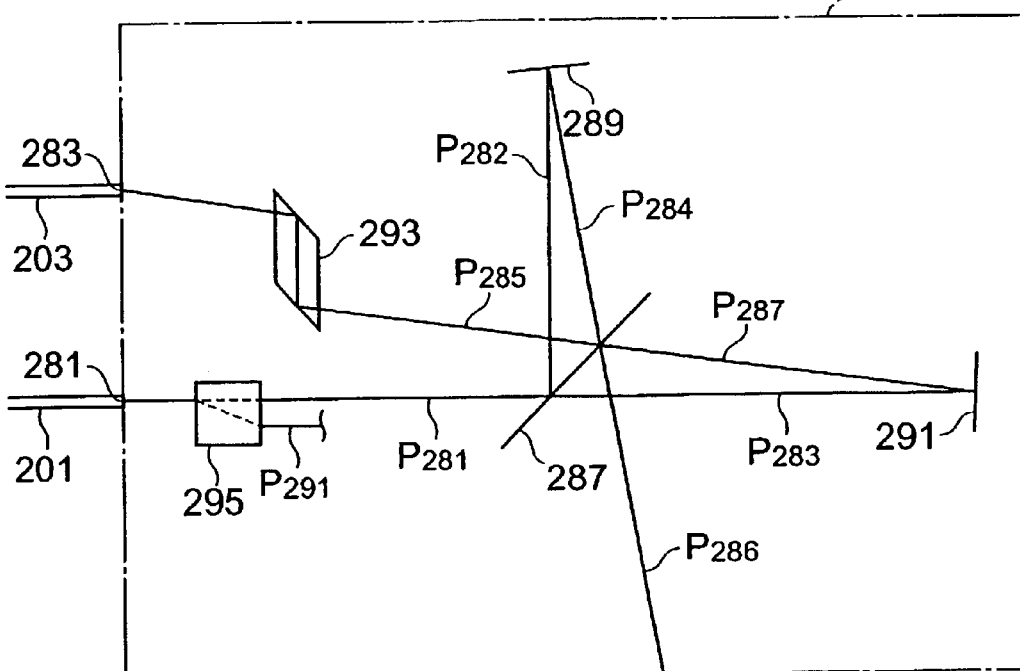
FIGS. 5A and 5B are block diagrams depicting the interleaver according to the fifth embodiment.
Figure 5B:
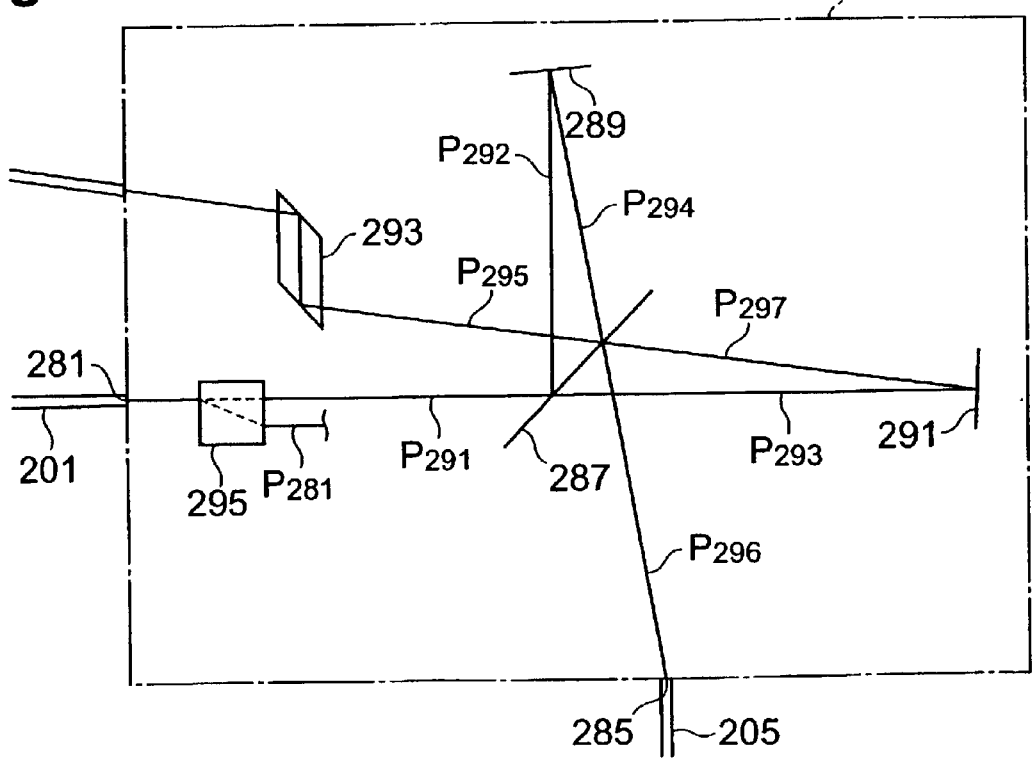

An interleaver according to the fifth embodiment of the present invention will now be described. FIGS. 5A and 5B are block diagrams depicting the interleaver 280 according to the present embodiment. The optical system (optical path) shown in FIG. 5A and the optical system (optical path) shown in FIG. 5B are positioned at the top and bottom of each other in a direction vertical to the page face.

The interleaver 280 is comprised of a first port 281, second port 283, third port 285, half mirror 287, first reflecting mirror (total reflection mirror) 289, second reflecting mirror (total reflection mirror) 291, branching prism 293 and a polarization separation element 295. The optical system, including the first port 281, second port 283, third port 285, half mirror 287, first reflecting mirror 289 and second reflecting mirror 291, constitutes a Michelson interferometer. In other words, the half mirror 287 branches the light, which reaches from the first port 281, into two, then outputs one light to the first reflecting mirror 289, and outputs the other light to the second reflecting mirror 291. The half mirror 287 also branches the light, which is reflected by the first reflecting mirror 289, into two, then outputs one light to the second port 283, and outputs the other light to the third port 285.

The branching prism 293 is installed between the half mirror 287 and the second port 283, and outputs the light from the half mirror 287 to the second port 283 in a state where the space between the input optical axis from the first port 281 and the output optical axis to the second port 283 is spread.

The polarization separation element 295 is comprised of a double refraction material installed between the first port 281 and the half mirror 287, separates the light which reaches from the first port 281 into two lights having polarization planes perpendicular to each other, then outputs one light, that is the light with the first polarization component, to the optical path $P_{281}$, and outputs the other light, that is the light with the second polarization component, which is perpendicular to the light with the first polarization component, to the optical path $P_{291}$. The optical path $P_{281}$ and the optical path $P_{291}$ are positioned at the top and bottom of each other in a direction vertical to the page face in FIGS. 3A and 3B.

As FIG. 5A shows, the light, which is input to the half mirror 287 by the optical path $P_{281}$, is branched into two by the half mirror 287, then one light is output to the optical path $P_{282}$, and the other light is output to the optical path $P_{283}$. The light, which is output from the half mirror 287 to the optical path $P_{282}$, is reflected by the first reflecting mirror 289, advances on the optical path $P_{284}$ to return to the half mirror 287, is branched into two by the half mirror 287, then one light is output to the optical path $P_{285}$, and the other light is output to the optical path $P_{286}$. The light, which is output from the half mirror 287 to the optical path $P_{283}$, is reflected by the second reflecting mirror 291, advances on the optical path $P_{287}$ to return to the half mirror 287, is branched into two by the half mirror 287, then one light is output to the optical path $P_{285}$, and the other light is output to the optical path $P_{286}$. The light which is output to the optical path $P_{285}$ is output to the second port 283. During this propagation, the light remains as light with the first polarization component. The light which is output to the optical path $P_{286}$ is dropped.

As FIG. 5B shows, the light, which is input to the half mirror 287 by the optical path $P_{291}$, is branched into two by the half mirror 287, then one light is output to the optical path $P_{292}$, and the other light is output to the optical path $P_{293}$. The light, which is output from the half mirror 287 to the optical path $P_{292}$, is reflected by the first reflecting mirror 289, advances on the optical path $P_{294}$ to return to the half mirror 287, is branched into two by the half mirror 287, then one light is output to the optical path $P_{295}$, and the other light is output to the optical path $P_{296}$. The light, which is output from the half mirror 287 to the optical path $P_{293}$, is reflected by the second reflecting mirror 291, advances on the optical path $P_{297}$ to return to the half mirror 287, is branched into two by the half mirror 287, then one light is output to the optical path $P_{295}$, and the other light is output to the optical path $P_{296}$. The light, which is output to the optical path $P_{296}$, is output to the third port 285. During this propagation, the light remains as light with the second polarization component. The light which is output to the optical path $P_{295}$ is dropped.

In each optical system constituting the above mentioned Michelson interferometer, the output optical axes from the half mirror 287 to the first reflecting mirror 289 (optical axis of the optical path $P_{282}$ and optical axis of the optical path $P_{292}$) and the reflected optical axes from the first reflecting mirror 281 (optical axis of the optical path $P_{284}$ and optical axis of the optical path $P_{294}$) cross at a predetermined angle greater than 0° (e.g. 0.3°), and the output optical axes from the half mirror 287 to the second reflecting mirror 291 (optical axis of the optical path $P_{283}$ and optical axis of the optical path $P_{293}$) and the reflected optical axes from the second reflecting mirror 291 (optical axis of the optical path $P_{287}$ and optical axis of the optical path $P_{297}$) cross at a predetermined angle greater than 0° (e.g. 0.3°), so that the input optical axis from the first port 281 and the output optical axis to the second port 283 become different when the light is output to the second port 283.

And in each optical system constituting the above mentioned Michelson interferometer, in order to cross the output optical axes from the half mirror 287 to the first reflecting mirror 289 (optical axis of the optical path $P_{282}$ and optical axis of the optical path $P_{292}$) and the reflected optical axis from the first reflecting mirror 289 (optical axis of the optical path $P_{284}$ and optical axis of the optical path $P_{294}$) at the above mentioned predetermined angle, the output axes of the first reflecting mirror 289 (optical axis of the optical path $P_{282}$ and optical axis of the optical path $P_{292}$) are set so as to cross with the reflecting face of the first reflecting mirror 289 at a predetermined angle other than 90° (e.g. 89.7°). In the same way, in order to cross the output optical axes from the half mirror 287 to the second reflecting mirror 291 (optical axis of the optical path $P_{283}$ and optical axis of the optical path $P_{293}$) and the reflected optical axis from the second reflecting mirror 291 (optical axis of the optical path $P_{287}$ and optical axis of the optical path $P_{297}$) at the above mentioned predetermined angle, the output optical axes to the second reflecting mirror 291 (optical axis of the optical path $P_{283}$ and optical axis of the optical path $P_{293}$) are set so as to cross with the reflecting face of the second reflecting mirror 291 at a predetermined angle other than 90° (e.g. 89.7°).

Also in each optical system constituting the above mentioned Michelson interferometer, the output optical axes from the half mirror 287 to the second port 283 and the third port 285 (optical axis of the optical path $P_{285}$ and optical axis of the optical path $P_{296}$) are set so as to cross with the branching face of the half mirror 287 at a predetermined angle other than 45° (e.g. 44.7°). And the input axes from the first port 281 to the half mirror 287 (optical axis of the optical path $P_{281}$ and optical axis of the optical path $P_{291}$) are set so as to cross with the branching face of the half mirror 287 at 45°.

The output optical axes from the half mirror 287 to the second port 283 and the third port 285 (optical axis of the optical path $P_{285}$ and optical axis of the optical path $P_{296}$) may be set so as to cross with the half mirror 287 at 45°, and the input optical axes from the first port 281 to the half mirror 287 (optical axis of the optical path $P_{81}$ and optical axis of the optical path $P_{291}$) may be set so as to cross with the branching face of the half mirror 287 at the above mentioned predetermined angle other than 45°. Also the input optical axes from the first port 281 to the half mirror 287 (optical axis of the optical path $P_{281}$ and optical axis of the optical path $P_{291}$) and the output optical axes from the half mirror 287 to the second port 283 and the third port 285 (optical axis of the optical path $P_{285}$ and optical axis of the optical path $P_{296}$) may be set so as to cross with the branching face of the half mirror 287 at a predetermined angle other than 45° respectively.

This interleaver 280 operates as follows. The light which is input from the optical fiber 201 to the first port 281 is polarization-separated by the polarization separation element 295, then light with the first polarization component is output to the optical path $P_{281}$, and the light with the second polarization component is output to the optical path $P_{291}$.

The light, which is input from the optical path $P_{291}$ to the half mirror 287, is branched into two by the half mirror 287, and is output to the optical paths $P_{282}$ and $P_{283}$. The light which is output to the optical path $P_{282}$ reaches to and is reflected from the first reflecting mirror 289, and returns to the half mirror 287 by the optical path $P_{284}$. The light, which is input to the half mirror 287 by the optical path $P_{284}$, is branched into two by the half mirror 287, and is output to the optical paths $P_{285}$ and $P_{286}$. The light which is output to the optical path $P_{283}$ reaches to and is reflected from the second reflecting mirror 291, and returns to the half mirror 287 by the optical path $P_{287}$. The light, which is input to the half mirror 287 by the optical path $P_{287}$, is branched into two by the half mirror 287, and is output to the optical paths $P_{285}$ and $P_{286}$. During this propagation, the light remains as light with the first polarization component.

The light, which is input to the half mirror 287 by the optical path $P_{291}$, is branched into two by the half mirror 287, and is output to the optical paths $P_{292}$ and $P_{293}$. The light which is output to the optical path $P_{292}$ reaches to and is reflected from the first reflecting mirror 289, and returns to the half mirror 287 by the optical path $P_{294}$. The light, which is input to the half mirror 287 by the optical path $P_{294}$, is branched into two by the half mirror 287, and is output to the optical paths $P_{295}$ and $P_{296}$. The light which is output to the optical path $P_{293}$ reaches to and is reflected from the second reflecting mirror 291, and returns to the half mirror 287 by the optical path $P_{297}$. The light, which is input to the half mirror 287 by the optical path $P_{297}$, is branched into two by the half mirror 287, and is output to the optical paths $P_{295}$ and $P_{296}$. During this propagation, the light remains as light with the second polarization component.

The light with the first polarization component, which is output from the half mirror 287 to the optical path $P_{285}$, is light where lights which reach the half mirror 287 by the optical path $P_{284}$ and the optical path $P_{287}$ respectively are partially super-imposed. The light with the first polarization component, which is output from the half mirror 287 to the optical path $P_{285}$, is output to the optical fiber 203 in a state where the space from the optical path $P_{281}$ (input optical axis) is spread by the branching prism 293.

The light with the second polarization component, which is output from the half mirror 287 to the optical path $P_{296}$, is light where lights which reach the half mirror 287 by the optical path $P_{294}$ and the optical path $P_{297}$ respectively are partially super-imposed. The light with the second polarization component, which is output from the half mirror 287 to the optical path $P_{295}$, is output to the optical fiber 205.

In this interleaver 280, the Michelson interferometer comprised of the optical system, which includes the first port 281, second port 283, third port 285, half mirror 287, first reflecting mirror 289, and the second reflecting mirror 291, has a transmission characteristic with a cycle according to the optical path length difference of the two optical paths. Therefore this interleaver 280 can input the signal light with multiband ($\lambda_1, \lambda_2, ---, \lambda_{2n-1}, \lambda_{2n}, ---$) by the optical fiber 201, separate the signal light, output the signal light with the first wavelength group $\Lambda_1$ ($\lambda, \lambda_2, ---, \lambda_{2-1}, ---$) to the optical fiber 203, and output the signal light with the second wavelength group $\Lambda_2$ ($\lambda_2, \lambda_4, ---, \lambda_{2n}, ---$) to the optical fiber 205. Here $\lambda_1 < \lambda_2 < ---, <\lambda_{2n-1}\lambda_{2n}< ---$.

The optical system constituting the above mentioned Michelson interferometer is configured so as to output one of the two lights having polarization planes perpendicular to each other, which is output from the polarization separation element 295 (light with first polarization component) to the second port 283, and output the other light (light with second polarization component) to the third port 285. Therefore the interleaver 280 is a polarization interleaver.

Also the light which is output from the first port 281 is output to the second port 283 and the third port 285 by the half mirror 287 and the reflecting mirrors 289 and 291, which are included in the optical system constituting the Michelson interferometer. Therefore an interleaver with an optical system which does not need an optical circulator can be implemented, so the interleaver which is inexpensive and with a less complex optical system is provided.

(Sixth Embodiment)

Figure 6:
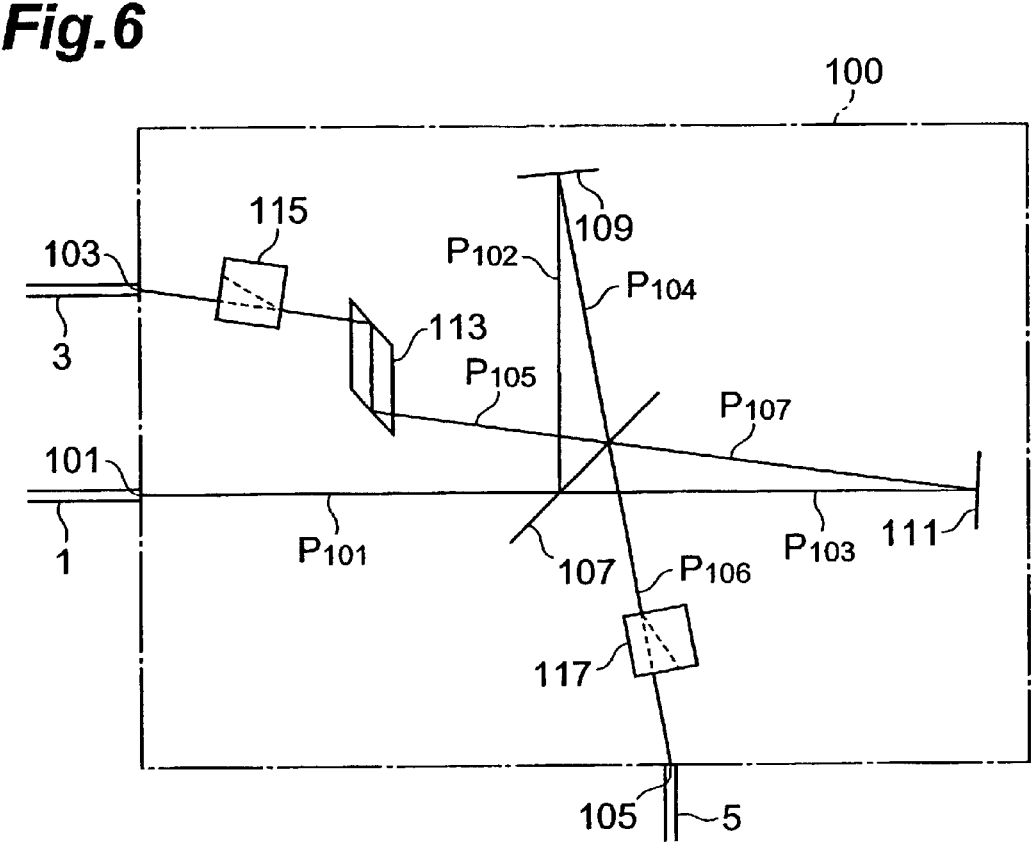
FIG. 6 is a block diagram depicting the interleaver according to the sixth embodiment.

An interleaver according to the sixth embodiment of the present invention will now be described. FIG. 6 is a block diagram depicting the interleaver 100 according to the present embodiment.

The interleaver 100 is comprised of a first port 101, second port 103, third port 105, half mirror 107, first reflecting mirror (total reflection mirror) 109, second reflecting mirror (total reflection mirror) 111, branching prism 113, polarization separation element 115, and polarization separation element 117. The optical system, including the first port 101, second port 103, third port 105, half mirror 107, first reflecting mirror 109, and second reflecting mirror 111, constitutes a Michelson interferometer. In other words, the half mirror 107 branches the light which reaches from the first port 101, into two, then outputs one light to the first reflecting mirror 109, and outputs the other light to the second reflecting mirror 111. The half mirror 107 also branches the light, which is reflected by the first reflecting mirror 109, into two, then outputs one light to the second port 103, and outputs the other light to the third port 105. The half mirror 107 also branches the light, which is reflected by the second reflecting mirror 111, into two, then outputs one light to the second port 103, and outputs the other light to the third port 105.

The branching prism 113 is installed between the half mirror 107 and the second port 103, and outputs the light from the half mirror 107 to the second port 103 in a state where the space between the input optical axis from the first port 101 and the output optical axis to the second port 103 is spread.

As FIG. 6 shows, the light, which is input from the optical path $P_{101}$ to the half mirror 107, is branched into two by the half mirror 107, then one light is output to the optical path $P_{102}$, and the other light is output to the optical path $P_{103}$. The light, which is output from the half mirror 107 to the optical path $P_{102}$, is reflected by the first reflecting mirror 109, advances on the optical path $P_{104}$ to return to the half mirror 107, is branched into two by the half mirror 107, then one light is output to the optical path $P_{105}$, and the other light is output to the optical path $P_{106}$. The light, which is output from the half mirror 107 to the optical path $P_{103}$, is reflected by the second reflecting mirror 111, advances on the optical path $P_{107}$ to return to the half mirror 107, is branched into two by the half mirror 107, then one light is output to the optical path $P_{105}$, and the other light is output to the optical path $P_{106}$.

The polarization separation element 115 is comprised of a double refraction material installed between the half mirror 107 and the second port 103, separates the light which reaches from the half mirror 107 into two lights having polarization planes perpendicular to each other, then outputs one light, that is the light with the first polarization component, to the second port 103.

The polarization separation element 117 is comprised of a double refraction material installed between the half mirror 107 and the third port 105, separates the light which reaches from the half mirror 107 into two lights having polarization planes perpendicular to each other, then outputs one light, that is light with the second polarization component which has a polarization plane perpendicular to the polarization plane of the light to be output to the second port 103 (light with the first polarization component), to the third port 105.

In the optical system constituting the above mentioned Michelson interferometer, the output optical axis from the half mirror 107 to the first reflecting mirror 109 (optical axis of the optical path $P_{102}$) and the reflected optical axis from the first reflecting mirror 109 (optical axis of optical path $P_{104}$) cross at a predetermined angle greater than 0° (e.g. 0.3°), and the output optical axis from the half mirror 107 to the second reflecting mirror 111 (optical axis of the optical path $P_{103}$) and the reflected optical axis from the second reflecting mirror 111 (optical axis of optical path $P_{107}$) cross at a predetermined angle greater than 0° (e.g. 0.3°), so that the input optical axis from the first port 101 and the output optical axis to the second port 103 become different when the light is output to the second port 103.

Also in the optical system constituting the above mentioned Michelson interferometer, in order to cross the output optical axis from the half mirror 107 to the first reflecting mirror 109 (optical axis of the optical path $P_{102}$) and the reflected optical axis from the first reflecting mirror 109 (optical axis of the optical path $P_{104}$) at the above mentioned predetermined angle, the output optical axis to the first reflecting mirror 109 (optical axis of the optical path $P_{102}$) is set so as to cross with the reflecting face of the first reflecting mirror 109 at a predetermined angle other than 90° (e.g. 89.7°). In the same way, in order to cross the output optical axis from the half mirror 107 to the second reflecting mirror 111 (optical axis of the optical path $P_{103}$) and the reflected optical axis from the second reflecting mirror 111 (optical axis of the optical path $P_{107}$) at the above mentioned predetermined angle, the output optical axis to the second reflecting mirror 111 (optical axis of the optical path $P_{103}$) is set so as to cross with the reflecting face of the second reflecting mirror 111 at a predetermined angle other than 90° (e.g. 89.7°).

Also in the optical system constituting the above mentioned Michelson interferometer, the output optical axes from the half mirror 107 to the second port 103 and the third port 105 (optical axes of the optical paths $P_{105}$ and $P_{106}$) are set so as to cross with the branching face of the half mirror 107 at a predetermined angle other than 45° (e.g. 44.7°). And the input optical axis from the first port 101 to the half mirror 107 (optical axis of the optical path $P_{101}$) is set so as to cross with the branching face of the half mirror 107 at 45°.

The output optical axes from the half mirror 107 to the second port 103 and the third port 105 (optical axes of the optical paths $P_{105}$ and $P_{106}$) may be set so as to cross with the half mirror 107 at 45°, and the input optical axis from the first port 101 to the half mirror 107 (optical axis of the optical path $P_{101}$) may be set so as to cross with the branching face of the half mirror 107 at the above mentioned predetermined angle other than 45°. Also the input optical axis from the first port 101 to the half mirror 107 (optical axis of the optical path $P_{101}$) and the output optical axes from the half mirror 107 to the second port 103 and the third port 105 (optical axes of the optical paths $P_{105}$ and $P_{106}$) may be set so as to cross with the branching face of the half mirror 107 at a predetermined angle other than 45° respectively.

This interleaver 100 operates as follows. The light, which is input to the first port 101 by the optical fiber 1, is output to the optical path $P_{101}$. The light, which is input to the half mirror 107 by the optical path $P_{101}$, is branched into two by the half mirror 107, and is output to the optical paths $P_{102}$ and $P_{103}$, respectively. The light, which is output to the optical path $P_{102}$ reaches to and is reflected from the first reflecting mirror 109, and returns to the half mirror 107 by the optical path $P_{104}$. The light, which is input to the half mirror 107 by the optical path $P_{104}$, is branched into two by the half mirror 107, and is output to the optical paths $P_{105}$ and $P_{106}$. The light, which is output to the optical path $P_{103}$, reaches to and is reflected from the second reflecting light 111, and returns to the half mirror 107 by the optical path $P_{107}$. The light, which is input to the half mirror 107 by the optical path $P_{107}$, is branched into two by the half mirror 107, and is output to the optical paths $P_{105}$ and $P_{106}$.

The light, which is output from the half mirror 107 to the optical path $P_{105}$, is light where lights which reach the half mirror 107 from the optical path $P_{104}$ and optical path $P_{107}$ respectively are partially super-imposed, and is polarization-separated by the polarization separation element 115. The light with the first polarization component out of the polarization-separated lights is output to the optical fiber 3 by the branching prism 113 in a state where the space from the optical path $P_{101}$ (input optical axis) is spread.

The light, which is output from the half mirror 107 to the optical path $P_{106}$, is also light where the lights which reach the half mirror 107 by the optical path $P_{104}$ and optical path $P_{107}$ respectively are partially super-imposed, and is polarization-separated by the polarization separation element 117. The light with the second polarization component out of the polarization-separated lights is output to the optical fiber 5.

In this interleaver 100, the Michelson interferometer comprised of the optical system, which includes the first port 101, second port 103, third port 105, half mirror 107, first reflecting mirror 109, and the second reflecting mirror 111, has a transmission characteristic with a cycle according to the optical path length difference of the two optical paths. Therefore this interleaver 100 can input the signal light with multiband ($\lambda_1, \lambda_2, ---, \lambda_{2n-1}, \lambda_{2n}, ---$) from the optical fiber 1, separate the signal light, output the signal light with the first wavelength group $\Lambda_1$ ($\lambda_1, \lambda_3, ---, \lambda_{2n-1}, ---$) to the optical fiber 3, and output the signal light with the second wavelength group $\Lambda_2$ ($\lambda_2, \lambda_4, ---, \lambda_{2n}, ---$) to the optical fiber 5. Here $\lambda_1 < \lambda_2 < --- < \lambda_{2n-1} < \lambda_{2n} < ---$.

The optical system constituting the above mentioned Michelson interferometer is configured so as to output one of the two lights having polarization planes perpendicular to each other which is output from the polarization separation element 115 (light with the first polarization component) to the second port 103, and output the other light, out of the two lights having polarization planes perpendicular to each other which is output from the polarization separation element 117 (light with the second polarization component), to the third port 105. Therefore the interleaver 100 is a polarization interleaver.

Also the light which is input from the first port 101 is output to the second port 103 and the third port 105 by the half mirror 107 and the reflecting mirrors 109 and 111, which are included in the optical system constituting the Michelson interferometer. Therefore the interleaver 100 with an optical system which does not need an optical circulator can be implemented, so the interleaver 100 which is inexpensive and with a less complex optical system is provided.

The present invention is not limited by the above embodiment, but various modifications are possible. For example, in the above mentioned embodiments, a Gires-Tournois resonator, which includes a semi-transparent mirror, which transmittance is several tens %, and a total reflection mirror, may be used as one reflecting mirror.

In the third to fifth embodiment, the half mirror 217, 247 or 287, and each reflecting mirror 219 and 221, 249 and 251, or 289 and 291, may be installed independently for each of the respective optical systems which are installed at the top and bottom of each other.

As described above, in the present invention, the light which is input from the first port is output to the second port and to the third port by the half mirror and the reflecting mirrors which are included in the optical system constituting the Michelson interferometer. Therefore according to the present invention, it is possible to implement an optical system which does not need an optical circulator, and an interleaver which is inexpensive, and with a less complex optical system can be provided.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An interleaver comprising:
   an optical system having a first port, a second port, a third port, a half mirror, a first reflecting mirror and a second reflecting mirror,
   wherein light which reaches from said first port to said half mirror is branched into two, and these lights are output to said first reflecting mirror and said second reflecting mirror respectively;
   wherein light which is reflected by said first reflecting mirror and reaches said half mirror is branched into two, and these lights are output to said second port and said third port respectively; and
   wherein light which is reflected by the second reflecting mirror and reaches said half mirror is branched into two, and these lights are output to said second port and said third port respectively.

2. The interleaver according to claim 1, wherein in said optical system, the output optical axis from said half mirror to said first reflecting mirror and the reflected optical axis from said first reflecting mirror cross at a predetermined angle greater than 0°, and the output optical axis from said half mirror to said second reflecting mirror and the reflected optical axis from said second reflecting mirror cross at a predetermined angle greater than 0°.

3. The interleaver according to claim 1, wherein in said optical system, the input optical axis from said first port to said half mirror and at least one of the output optical axes from said half mirror to said second port and said third port cross with the branching face of said half mirror at a predetermined angle other than 45°, so that the output optical axis from said half mirror to said first reflecting mirror and the reflected optical axis from said first reflecting mirror cross at an angle greater than 0°, and the output optical axis from said half mirror to said second reflecting mirror and the reflected optical axis from said second reflecting mirror cross at a predetermined angle greater than 0°.

4. The interleaver according to claim 1,
wherein in said optical system, said output optical axis to said first reflecting mirror crosses with the reflecting face of said first reflecting mirror at a predetermined angle other than 90°, and said output optical axis to said second reflecting mirror crosses with the reflecting face of said second reflecting mirror at a predetermined angle other than 90°, so that the output optical axis from said half mirror to said first reflecting mirror and the reflected optical axis from said first reflecting mirror cross at a predetermined angle greater than 0°, and the output optical axis from said half mirror to said second reflecting mirror and the reflected optical axis from said second reflecting mirror cross at a predetermined angle greater than 0°.

5. The interleaver according to claim 1,
wherein in said optical system, the input optical axis from said first port to said half mirror and at least one of the output optical axes from said half mirror to said second port and said third port cross with the branching face of said half mirror at a predetermined angle other than 45°, said output optical axis to said first reflecting mirror crosses with the reflecting face of said first reflecting mirror at a predetermined angle other than 90°, and the output optical axis to said second reflecting mirror crosses with the reflecting face of said second reflecting mirror at a predetermined angle other than 90°.

6. The interleaver according to one of claims 1, further comprising optical axis correction means for paralleling the input optical axis from said first port and the output optical axis to said second port.

7. The interleaver according to claim 6, wherein said optical axis correction means comprises a prism for converting a state where said input optical axis from said first port and said output optical axis to said second port cross at a predetermined angle into a state where said input optical axis and said output optical axis are parallel.

8. An interleaver according to claim 1, further comprising:
a polarization separation element which is installed between said first port and said half mirror of said optical system for separating light which reaches from said first port into two lights having polarization planes perpendicular to each other and outputting the separated lights to different optical paths respectively.

9. The interleaver according to claim 8, further comprising a polarization plane paralleling element which is installed between said polarization separation element and said half mirror of said optical system, inputs two lights which are output from said polarization separation element and have polarization planes perpendicular to each other, parallels the polarization planes of the respective lights, and outputs these paralleled lights to said half mirror respectively.

10. The interleaver according to claim 9, further comprising a polarization orthogonalizing element which is installed between said half mirror and said second port of said optical system, inputs two lights which reach from said half mirror and have polarization planes parallel to each other, orthogonalizes the polarization planes of the respective lights, and outputs the orthogonalized lights to said second port respectively.

11. The interleaver according to claim 10, further comprising a polarization combining element which is installed between said polarization plane orthogonalizing element and said second port of said optical system, inputs two lights which are output from said polarization plane orthogonalizing element and have the polarization planes perpendicular to each other, combines these two lights and outputs them to said second port.

12. The interleaver according to claim 9, further comprising a polarization plane orthogonalizing element which is installed between said half mirror and said third port of said optical system, inputs two lights which reach from said half mirror and have polarization planes parallel to each other, orthogonalizes the polarization planes of the respective lights, and outputs the orthogonalized lights to said third port respectively.

13. The interleaver according to claim 12, further comprising a polarization combining element which is installed between said polarization plane orthogonalizing element and said third port of said optical system, inputs two lights which are output from said polarization plane orthogonalizing element and have the polarization planes perpendicular to each other, combines these two lights and outputs them to said third port.

14. The interleaver according to claim 8, wherein said optical system outputs one of the two lights which are output from said polarization separation element and have polarization planes perpendicular to each other to said second port, and outputs the other light to said third port.

15. The interleaver according to one of claim 8, wherein in said optical system, the output optical axis from said half mirror to said first reflecting mirror and the reflected optical axis from said first reflecting mirror cross at a predetermined angle greater than 0°, and the output optical axis from said half mirror to said second reflecting mirror and the reflected optical axis from said second reflecting mirror cross at a predetermined angle greater than 0°.

16. The interleaver according to one of claim 8, wherein in said optical system, the input optical axis from said first port to said half mirror and at least one of the output optical axes from said half mirror to said second port and said third port cross with the branching face of said half mirror at a predetermined angle other than 45°, so that the output optical axis from said half mirror to said first reflecting mirror and the reflected optical axis from said first reflecting mirror cross at a predetermined angle greater than 0°, and the output optical axis from said half mirror to said second reflecting mirror and the reflected optical axis from said second reflecting mirror cross at a predetermined angle greater than 0°.

17. The interleaver according to one of claim 8, wherein in said optical system, said output optical axis to said first reflecting mirror crosses with the reflecting face of said first reflecting mirror at a predetermined angle other than 90°, and said output optical axis to said second reflecting mirror crosses with the reflecting face of said second reflecting mirror at a predetermined angle other than 90°, so that the output optical axis from said half mirror to said first reflecting mirror and the reflected optical axis from said first reflecting mirror cross at a predetermined angle greater than 0°, and the output optical axis from said half mirror to said second reflecting mirror and the reflected optical axis from said second reflecting mirror cross at a predetermined angle greater than 0°.

18. The interleaver according to one of claim 8, wherein in said optical system, the input optical axis from said first port to said half mirror and at least one of the output optical axes from said half mirror to said second port and said third port cross with the branching face of said half mirror at a predetermined angle other than 45°, said output optical axis to said first reflecting mirror crosses with the reflecting face of said first reflecting mirror at a predetermined angle other than 90°, and the output optical axis to said second reflecting mirror crosses with the reflecting face of said second reflecting mirror at a predetermined angle other than 90°, so that the output optical axis from said half mirror to said first reflecting mirror and the reflected optical axis from said first reflecting mirror cross at a predetermined angle greater than 0°, and the output optical axis from said half mirror to said second reflecting mirror and the reflected optical axis from said second reflecting mirror cross at a predetermined angle greater than 0°.

19. The interleaver according to one of claim 8, further comprising an optical axis correction means for paralleling the input optical axis from said first port and the output optical axis to said second port.

20. The interleaver according to claim 19, wherein said optical axis correction means comprises a prism for converting a state where said input optical axis from said first port and said output optical axis to said second port cross at a predetermined angle into a state where said input optical axis and said output optical axis are parallel.

21. An interleaver comprising according to claim 1, further comprising a polarization separation element which is installed between said second port and said half mirror of said optical system for separating light which reaches from said half mirror into two lights having polarization planes perpendicular to each other, and outputting one of the separated lights to said second port; and a polarization separation element which is installed between said third port and said half mirror of said optical system for separating light which reaches from said half mirror into two lights having polarization planes perpendicular to each other, and outputting the light, having a polarization plane which is perpendicular to the polarization plane of the light to be output to said second port, to said third port.

* * * * *